(12) United States Patent
Pucher et al.

(10) Patent No.: US 12,548,855 B2
(45) Date of Patent: Feb. 10, 2026

(54) ASSEMBLY SET FOR ASSEMBLING A CARRIER FRAMEWORK FOR A STACK OF BATTERY CELL BLOCKS

(71) Applicant: SAMSUNG SDI CO., LTD., Yongin-si (KR)

(72) Inventors: Matthias Pucher, Lebring (AT); Bernhard Hadler, Feldkirchen/Graz (AT)

(73) Assignee: Samsung SDI Co., Ltd., Yongin-Si (KR)

( * ) Notice: Subject to any disclaimer, the term of this patent is extended or adjusted under 35 U.S.C. 154(b) by 379 days.

(21) Appl. No.: 17/668,259

(22) Filed: Feb. 9, 2022

(65) Prior Publication Data
US 2022/0255192 A1 Aug. 11, 2022

(30) Foreign Application Priority Data
Feb. 11, 2021 (EP) .................... 21156485

(51) Int. Cl.
*H01M 50/503* (2021.01)
*H01M 50/202* (2021.01)
(Continued)

(52) U.S. Cl.
CPC ....... *H01M 50/503* (2021.01); *H01M 50/202* (2021.01); *H01M 50/213* (2021.01); *H01M 50/264* (2021.01); *H01M 2220/20* (2013.01)

(58) Field of Classification Search
CPC ............. H01M 50/503; H01M 50/202; H01M 50/264; H01M 50/213; H01M 2220/20
See application file for complete search history.

(56) References Cited

U.S. PATENT DOCUMENTS

2013/0230761 A1  9/2013  Okutani et al.
2014/0322581 A1  10/2014  Rüter et al.
(Continued)

FOREIGN PATENT DOCUMENTS

CN  107482147 A  12/2017
CN  109844996 A  6/2019
(Continued)

OTHER PUBLICATIONS

Chinese Office Action, with English translation, dated Dec. 29, 2023, issued in corresponding Chinese Patent Application No. 202210127683.1 (18 pages).

(Continued)

*Primary Examiner* — Nicole M. Buie-Hatcher
*Assistant Examiner* — Taylor Harrison Krone
(74) *Attorney, Agent, or Firm* — Womble Bond Dickinson (US) LLP

(57) ABSTRACT

An assembly set for assembling a carrier framework for a stack of battery cell blocks is provided. The assembly set includes a first frame beam, a second frame beam, and a Z-shaped busbar. The Z-shaped busbar includes: a positive plate configured for connecting to positive terminals of battery cells of a first battery cell block; a negative plate configured for connecting to negative terminals of battery cells of a second battery cell block; and a connection plate connecting the positive plate and the negative plate. The Z-shaped busbar is fastened to the first frame beam and the second frame beam.

16 Claims, 7 Drawing Sheets

(51) Int. Cl.
*H01M 50/213* (2021.01)
*H01M 50/264* (2021.01)

(56) References Cited

U.S. PATENT DOCUMENTS

| | | |
|---|---|---|
| 2016/0111760 A1 | 4/2016 | Arai |
| 2019/0366875 A1 | 12/2019 | Hong et al. |
| 2020/0067056 A1 * | 2/2020 | Wynn ................. H01M 50/213 |
| 2020/0194843 A1 | 6/2020 | Kwon et al. |
| 2020/0280040 A1 * | 9/2020 | Lee .................... H01M 50/529 |
| 2021/0005865 A1 | 1/2021 | Yang et al. |
| 2021/0288387 A1 | 9/2021 | Cho et al. |

FOREIGN PATENT DOCUMENTS

| | | | | |
|---|---|---|---|---|
| CN | 209217036 U | | 8/2019 | |
| CN | 110710025 A | | 1/2020 | |
| CN | 112335108 A | | 2/2021 | |
| DE | 102016206463 A1 | * | 10/2017 | .......... H01M 10/643 |
| EP | 3 686 956 A1 | | 7/2020 | |
| EP | 3 709 388 A1 | | 9/2020 | |
| KR | 20190053124 A | * | 5/2019 | .......... H01M 50/502 |

OTHER PUBLICATIONS

European Search Report issued in corresponding application No. EP21156485.1, dated Aug. 2, 2021, 7 pages.

\* cited by examiner

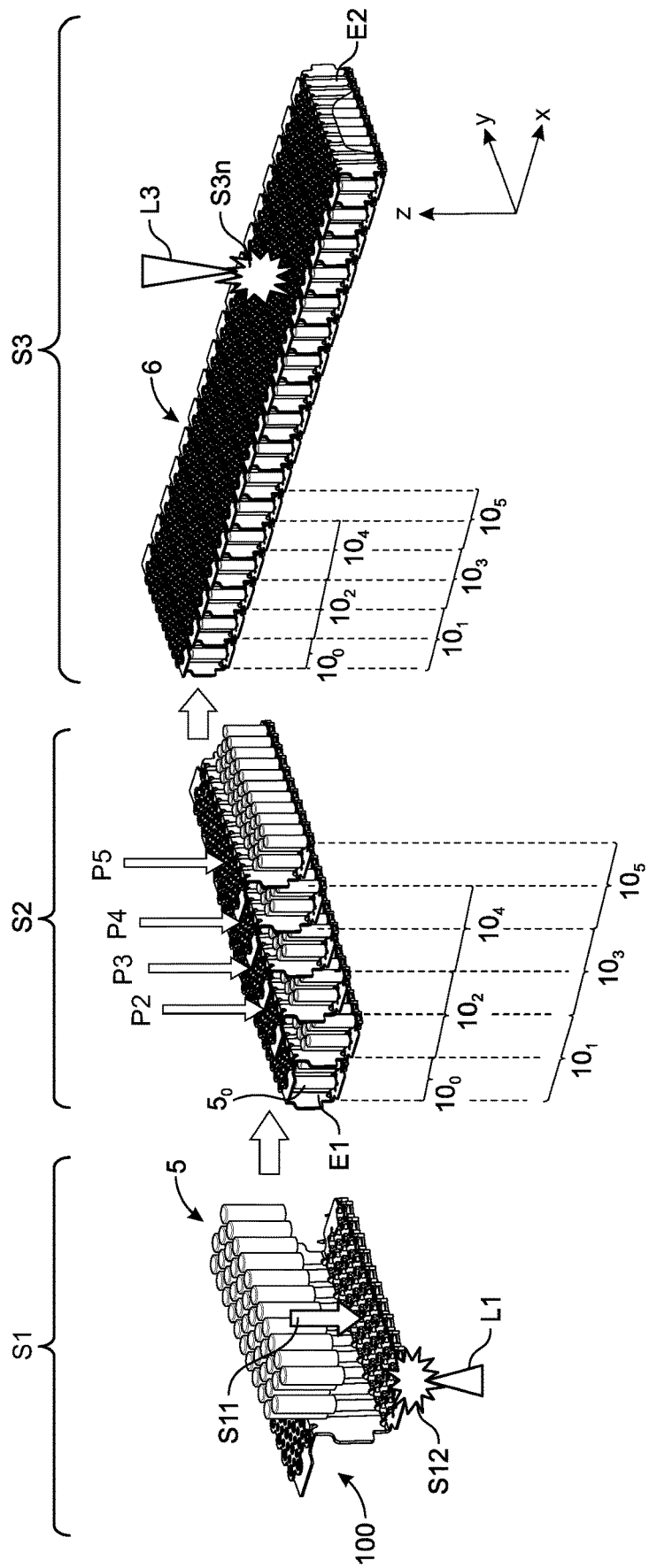

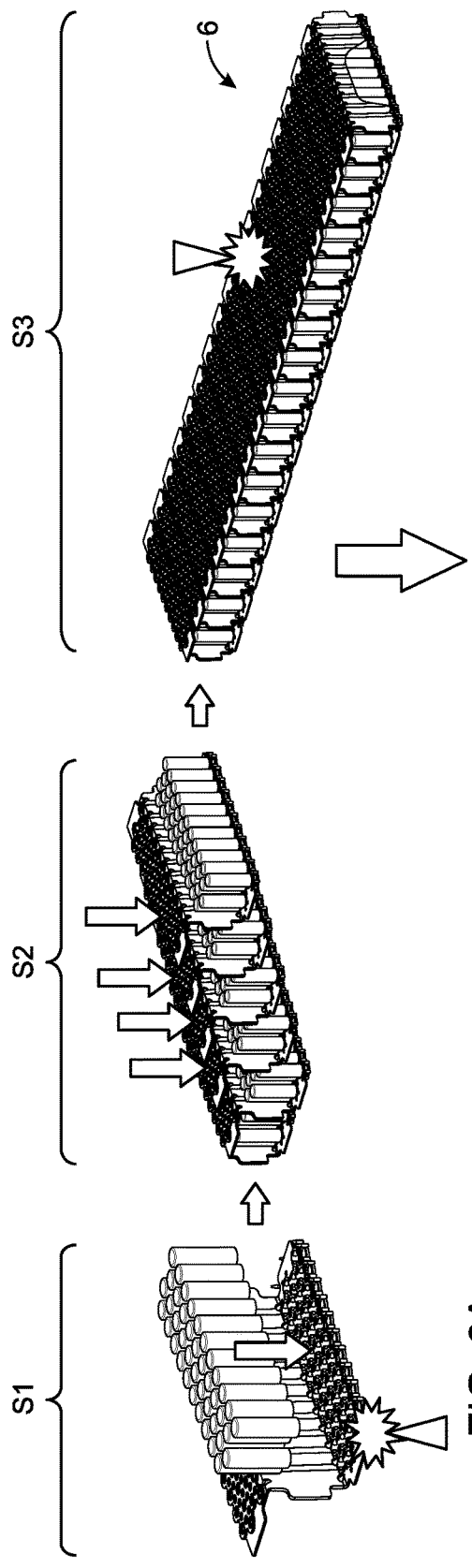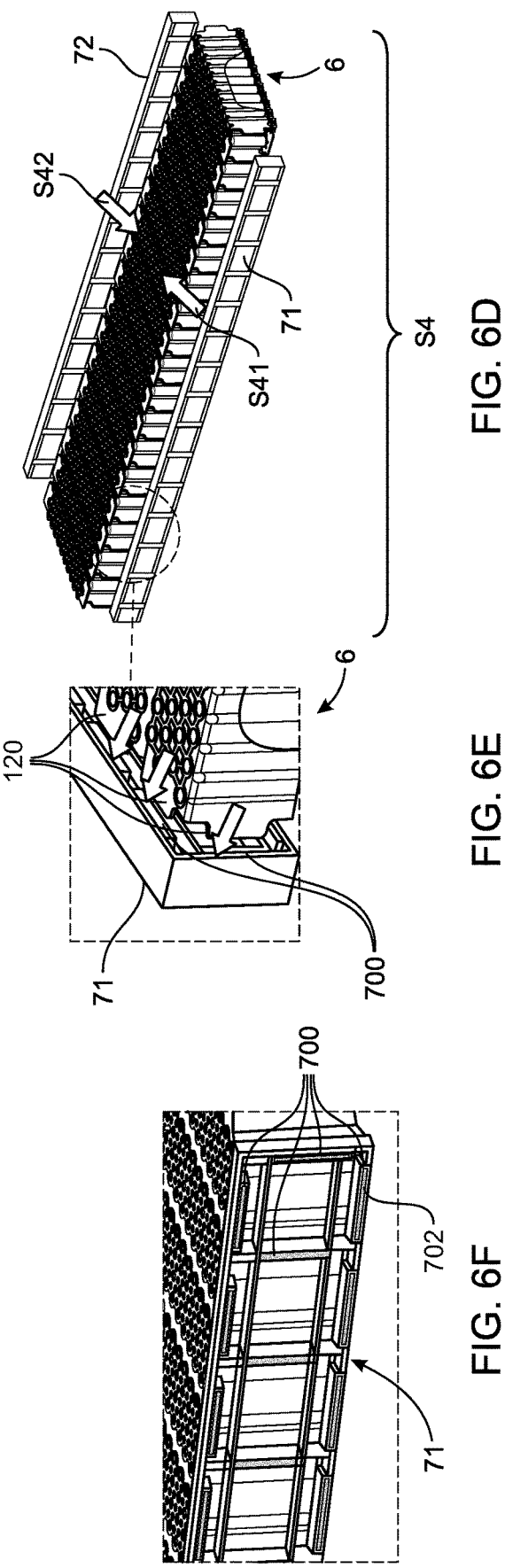

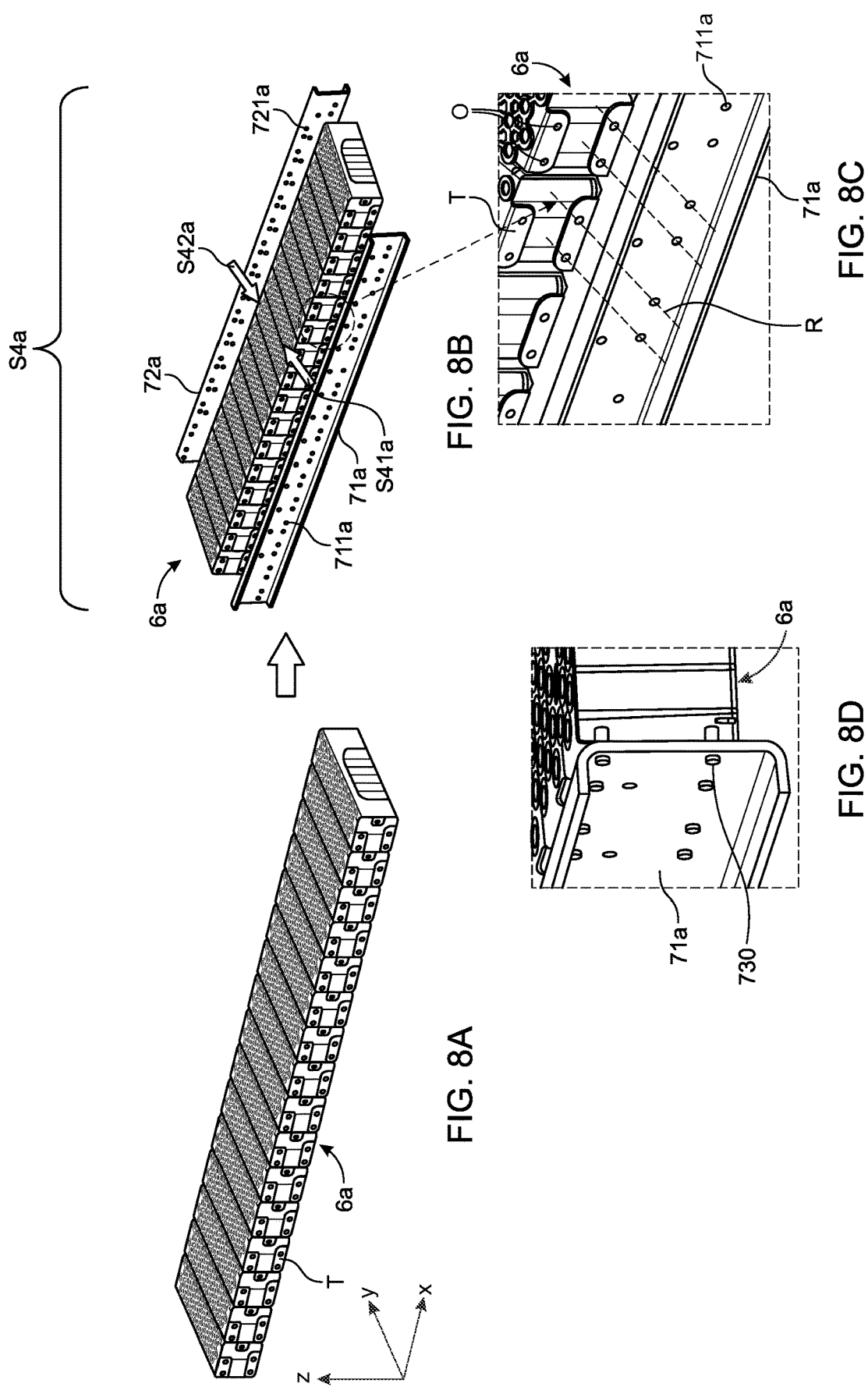

ASSEMBLY SET FOR ASSEMBLING A CARRIER FRAMEWORK FOR A STACK OF BATTERY CELL BLOCKS

CROSS-REFERENCE TO RELATED APPLICATION

This application claims priority to and the benefit of European Patent Application No. 21156485.1, filed in the European Patent Office on Feb. 11, 2021, the entire content of which is incorporated herein by reference.

BACKGROUND

1. Field

Aspects of embodiments of the present disclosure relate to an assembly set for assembling a carrier framework for a stack of battery cell blocks.

2. Background of the Related Art

In recent years, vehicles for transportation of goods and people have been developed that use electric power as a source for motion. Such an electric vehicle is an automobile that is propelled by an electric motor, using energy stored in rechargeable batteries. An electric vehicle may be solely powered by batteries or may be a hybrid vehicle powered in part by, for example, a gasoline generator. Furthermore, the vehicle may include a combination of electric motor and conventional combustion engine. In general, an electric-vehicle battery (EVB), or traction battery, is a battery used to power the propulsion of battery electric vehicles (BEVs). Electric-vehicle batteries differ from starting, lighting, and ignition batteries because they are designed to give power over sustained periods of time. A rechargeable (or secondary) battery differs from a primary battery in that it is designed to be repeatedly charged and discharged, while the latter is designed to provide only an irreversible conversion of chemical to electrical energy. Low-capacity rechargeable batteries may be used as a power supply for small electronic devices, such as cellular phones, notebook computers, and camcorders, while high-capacity rechargeable batteries may be used as the power supply for electric and hybrid vehicles and the like.

Generally, rechargeable batteries include an electrode assembly including a positive electrode, a negative electrode, and a separator interposed between the positive and negative electrodes, a case for receiving (or accommodating) the electrode assembly, and an electrode terminal electrically connected to the electrode assembly. An electrolyte solution is injected into the case to enable charging and discharging of the battery via an electrochemical reaction of the positive electrode, the negative electrode, and the electrolyte solution. The shape of the case, such as cylindrical or rectangular, depends on the battery's intended purpose. Lithium-ion (and similar lithium polymer) batteries, widely known via their use in laptops and consumer electronics, dominate the most recent electric vehicles in development.

Rechargeable batteries may be used as a battery module including of a plurality of unit battery cells coupled to each other in series and/or in parallel to provide a high energy content, in particular for motor driving of a hybrid vehicle. For example, the battery module is formed by interconnecting the electrode terminals of the plurality of unit battery cells in an arrangement based on a required amount of power and to realize a high-power rechargeable battery.

A battery pack is a set of any number of battery modules. Generally, the battery modules in a battery pack are identical. The battery modules may be configured in series, parallel, or a mixture of both to deliver the desired voltage, capacity, or power density. Components of battery packs include the individual battery modules and the interconnects, which provide electrical conductivity between the battery modules.

Mechanical integration of such a battery pack involves appropriate mechanical connections between the individual components of battery modules and between the batteries modules themselves and a supporting structure of the vehicle. Ideally, these connections remain functional and safe throughout the average service life of the battery system. Further, installation space and interchangeability requirements must be considered, especially in mobile applications.

Mechanical integration of battery modules may be achieved by providing a carrier framework and by positioning the battery modules thereon. Fixing the battery cells or battery modules may be achieved by, for example, fitted depressions in the framework or by mechanical interconnectors, such as bolts or screws. Alternatively, the battery modules may be confined by fastening side plates to lateral sides of the carrier framework. Further, cover plates may be fixed atop and below the battery modules.

The carrier framework of the battery pack may be mounted to a carrying structure of the vehicle. When the battery pack is to be fixed at the bottom of the vehicle, the mechanical connection may be established from the bottom side by, for example, bolts passing through the carrier framework of the battery pack. The framework is often made of aluminum or an aluminum alloy to reduce the total weight of the construction.

Conventional battery systems, despite any modular structure, generally include a battery housing that act as an enclosure to seal the battery system against the environment and to provide structural protection to the battery system's components. Housed battery systems are generally mounted as a whole into their application environment, such as an electric vehicle. Thus, the replacement of defective system parts, such as a defective battery submodule, requires dismounting the entire battery system and removal of its housing first. Even defects of small and/or cheap system parts might then lead to dismounting and replacement of the entire battery system and its separate repair. Because high-capacity battery systems are expensive, large, and heavy, such a procedure is burdensome and the storage, for example, in the mechanic's workshop, of the bulky battery systems is difficult.

Recent battery cell stacks, including those designed for cylindrical battery cells, generally include one or more structural parts, such as injection molded plastic parts, which are shaped like egg-crates, as well as parts for the electric connection between the cells. The latter parts are often referred to as "busbars" and are manufactured out of simple electric conductive sheet-metal plates. The joining technique for the cell may be fulfilled in several ways. However, these techniques often require an alternating orientation of the cells or cell bricks (e.g., parallel connected cell-blocks), which are connected in serial. This alternating assembly is primarily caused by the fact that on the major side of the cell, the clearance between the cell's main terminal (e.g., the positive-terminal) and the opposite potential (e.g., the negative-terminal), rather the cell can itself, is quite small, such that there is no package-efficient possibility to join sheet-metal busbars on only a single side of a cell. Currently, one of the industry standards is to use wire bonding as joining technology or to increase generally the space between each cell and especially between the serial connected cell bricks. However, with an alternating orientation, the behavior in case of a venting event (e.g., a thermal run-away) is always critical. The implementation of an appropriate cooling system for the battery cell stack may, thus, become complex too, as it often requires two cooling plates on both sides (e.g., top and bottom sides) of the cells.

SUMMARY

According to embodiments of the present disclosure a battery cell stack, an assembly set for assembling a battery cell stack, a method for assembling a battery cell stack, and an assembly set for assembling a carrier framework for a stack of battery cell blocks are provided.

Embodiments of the present disclosure overcome at least one of the problems existing in the related art to at least some extent. For example, an assembly set for assembling a carrier framework for a stack of battery cell blocks is provided, and the assembly set includes: one or more Z-shaped busbars; a first frame beam; and a second frame beam. The Z-shaped busbars includes: a positive plate configured for connecting to the positive terminals of the battery cells of a battery cell block; a negative plate configured for connecting the negative terminals of the battery cells of a further battery cell block; and a connection plate connecting the positive and the negative plate. The Z-shaped busbars further include: a first fastener configured for being fastened to the first frame beam; and a second fastener configured for being fastened to the second frame beam. The first frame beam includes a first fastening element such that all of the Z-shaped busbars can, at the same time, be connected with the respective first fastener of the Z-shaped busbars to the first frame beam. The second frame beam includes a second fastening element such that the Z-shaped busbars can, at the same time, be connected with the respective second fastener of the Z-shaped busbars to the second frame beam.

The expression "Z-shaped," in the present context, denotes that a Z-shaped busbar exhibits a profile or cross-section, which at least approximately reassembles the letter Z with the lower bar and the upper bar of the letter Z correspond to the cross-sections of the positive plate and the negative plate, respectively, and the line connecting the lower bar with the upper bar in the letter Z corresponding to the cross-section of the connection plate. Note, however, that the expression "Z-shaped" as used in the present context shall also cover or encompass embodiment in which the profile or cross-section of the Z-shaped busbar, the cross-section of the positive plate, and the cross-section of the connection plate are positioned to each other at an angle of about 90° or greater (in any case, however, at an angle smaller than 180°), and/or the profile or cross-section of the Z-shaped busbar, the cross-section of the negative plate, and the cross-section of the connection plate are positioned to each other at an angle of about 90° or greater (in any case, however, in an angle smaller than about 180°). The expression "Z-shaped" used in connection with busbars in the present disclosure shall refer to busbars being formed such that the positive plate and the negative plate protrude away—in opposite directions—from the connection plate.

In some embodiments of the assembly set according to the preset disclosure, the positive plate, the negative plate, and/or the connection plate have a rectangular shape. The Z-shaped busbar may be shaped such that the positive plate and the negative plate are positioned parallel to each other. In some embodiments in which the positive plate and the negative plate of a Z-shaped busbar are positioned parallel to each other, the connection plate may be positioned perpendicular to each of the positive plate and the negative plate. Thereby, one edge of the rectangular-shaped connection plate may connect to one edge of the rectangular-shaped positive plate, and the opposite edge of the connection plate may connect to one edge of the rectangular-shaped negative plate such that the positive plate protrudes from the connection plate in a direction opposite to the direction in which the negative plate protrudes from the connection plate.

In some embodiments, the Z-shaped busbars are identically shaped.

The battery cell blocks (which are not part of the above-described assembly set) each include a bundle of battery cells. The battery cells of a battery block are each orientated in the same direction (e.g., there is a direction, or predefined direction, such that for all of the battery cells of the battery cell block both the positive terminal and the negative terminal of the battery cell are positioned on one straight line parallel to this direction, and when viewed in that direction, the negative terminal is positioned behind the positive terminal). Further, the positive terminals of the battery cells of a battery cell block may all abut against the same (virtual) plane perpendicular to the direction. Also, the negative terminals of the battery cells of a battery cell block may all abut against the same (virtual) plane perpendicular to the direction. Of course, the plane against which the positive terminals abut is different from the plane against which the negative terminals abut, and the body of each of the battery cells extends between these two planes.

The side of a battery cell block at which all the positive terminals of the battery cells of the battery cell block are arranged is referred to as "the positive side of the battery cell block" in the following. Correspondingly, the side of a battery cell block at which all the negative terminals of the battery cells of the battery cell block are arranged is referred to as "the negative side of the battery cell block" in the following.

The body of each of the battery cells in a battery cell block may have a cylindrical shape, and the cylindrical surface may extend around a center axis parallel to the direction. The shape and size (e.g., the dimensions) of the battery cells of a battery cell block may be identical. The cylindrical battery cells of a battery block may be arranged such that each of the battery cells (except for those battery cells at the edge of the battery cell block) are surrounded (e.g., surrounded on a plane) by six further cylindrically shaped battery cells. These six further battery cells may be arranged in 6-fold symmetry around the battery cell centered in between the six further battery cells. These six further battery cells may each contact the battery cell centered between the six further battery cells or, alternatively, may each be spaced apart from the battery cell centered between the six further battery cells.

The Z-shaped busbars in the assembly set according to embodiments of the present disclosure may be configured such that, together with a set of suitable battery cell blocks, the number of battery cell blocks corresponds to the number of Z-shaped busbars in the assembly set. The Z-shaped busbars and the battery cell blocks may be assembled such that each Z-shaped busbar is connected, with the positive plate of this Z-shaped busbar, to the positive side of one of the battery cell blocks and is further connected, with the negative side of this Z-shaped busbar, to the negative side of one of the battery cell blocks.

Here and in the following, the expressions "connected" or "connectable" and the like, as far as they refer to a connection between terminals of a battery and a busbar, denote a mechanical and electrical connection or connectability. The mechanical connectability between a terminal of a battery and a plate of the busbar may denote that the terminal touches the plate of the busbar; a permanent connection between a terminal of a battery and a plate of a busbar may, however, be provided by further fixating elements.

In one embodiment of the assembly set, at least one of the Z-shaped busbars is integrally formed. In some embodiments, each of the Z-shaped busbars in the assembly set may be integrally formed. The expression "integrally formed" or "formed integrally" shall denote, in this context, that the Z-shaped busbar is formed as one piece. At least one of the integrally formed Z-shaped busbars may be manufactured by bending a single sheet of metal.

At least one of the Z-shaped busbars may be made of metal. In some embodiments, each of the Z-shaped busbars is made of metal. The metal may be aluminum, copper, or iron. The metal may be an alloy including copper and/or iron. The metal may be an aluminum alloy. In one embodiment, the metal is a high-strength aluminum alloy. The Z-shaped busbars provide appropriate structural rigidity for mechanical stability of the assembled carrier framework.

In some embodiments, the wall thickness of each of the Z-shaped busbars is at least about 1 mm, such as at least about 1.5 mm, and in one embodiment, is 1.5 mm.

In one embodiment of the assembly set, the connection plate of each of the Z-shaped busbars is configured to separate a pair of battery cell blocks when one of the battery cell blocks of the pair of battery cell blocks is connected to the positive plate of the Z-shaped busbar and the other of the battery cell blocks of the pair of battery cell blocks is connected to the negative plate of the Z-shaped busbar.

In one embodiment of the assembly set, the connection plate extends between the battery cell blocks of a pair of battery cell blocks when one of the battery cell blocks of the pair of battery cell blocks is connected to the positive plate of the Z-shaped busbar and the other of the battery cell blocks of the pair of battery cell blocks is connected to the negative plate of the Z-shaped busbar such that, for each battery cell block of the pair of battery cell blocks, the connection plate completely (or entirely) covers the side of this battery cell block facing the other battery cell block.

The above-described separation of two battery cell blocks connected to a Z-shaped busbar by the connection plate in embodiments of the present disclosure reduces the likelihood of a transgression of a thermal event (e.g., a thermal run-away) from one battery cell block connected to the busbar to the other battery cell block connected to the busbar in case one of these battery cell blocks is affected by (or experiences) a thermal event.

In one embodiment of the assembly set according to the present disclosure, the connection plate of at least one of the Z-shaped busbars, and in some embodiments, each of the Z-shaped busbars, may be corrugated. The corrugated connection plate of a Z-shaped busbar may have grooves (or embayments). The grooves (or embayments) may extend along a straight line from the positive plate to the negative plate of the Z-shaped busbar.

In one embodiment of the assembly set, for at least one of the Z-shaped busbars, a negative lead frame is provided. The negative lead frame is connectable to the side of the negative plate of this Z-shaped busbar that is opposite to the side configured to be connected to the negative terminals of the battery cells of a battery cell block. The negative plate of this Z-shaped busbar has a plurality of openings positioned at the locations of the negative terminals of the battery cells when the battery cell block is connected to the negative plate. The negative lead frame is, for example, permanently connectable through the openings in the negative plate to the negative terminals of the battery cells when the said battery cell block is connected to the negative plate.

In some embodiments, for each of the Z-shaped busbars in the assembly set according to the present disclosure, a negative lead frame is provided. The negative lead frame is connectable to the side of the negative plate of this Z-shaped busbar that is opposite to the side configured to be connected to the negative terminals of the battery cells of a battery cell block. The negative plate of this Z-shaped busbar has a plurality of openings positioned at the locations of the negative terminals of the battery cells when the battery cell block is connected to the negative plate; and the negative lead frame may be permanently connectable, through the openings in the negative plate, to the negative terminals of the battery cells when the battery cell block is connected to the negative plate.

The negative lead frame(s) may be permanently connectable, through the openings in the negative plate, to the negative terminals of the battery cells when the battery cell block is connected to the negative plate by, for example, welding, such as laser welding.

The negative lead frame(s) may have a smaller wall thickness in comparison to the wall thickness of the Z-shaped busbars to improve the welding process. The wall thickness of the negative lead frames may correspond to the wall thickness of the battery cell cans of the battery cells that are to be connected (e.g., permanently connected) to the negative lead frames. The wall thickness of the negative lead frame(s) may be in a range of about 0.3 and about 0.5 mm. In one embodiment, the wall thickness of the negative lead frame(s) is 0.4 mm.

In one embodiment of the assembly set, for at least one of the Z-shaped busbars, a positive lead frame is provided. The positive lead frame is connectable to the side of the positive plate of this Z-shaped busbar that is opposite to the side configured to be connected to the positive terminals of the battery cells of a battery cell block. The positive plate of this Z-shaped busbar has a plurality of openings positioned at the locations of the positive terminals of the battery cells when the battery cell block is connected to the positive plate, and the positive lead frame may be permanently connectable, through the openings in the positive plate, to the positive terminals of the battery cells when the battery cell block is connected to the positive plate.

In some embodiments, for each of the Z-shaped busbars in the assembly set according to the present disclosure, a positive lead frame is provided. The positive lead frame is connectable to the side of the positive plate of this Z-shaped busbar that is opposite to the side configured to be connected to the positive terminals of the battery cells of a battery cell block. The positive plate of this Z-shaped busbar has a plurality of openings positioned at the locations of the positive terminals of the battery cells when the battery cell block is connected to the positive plate, and the positive lead frame may be permanently connectable, through the openings in the negative plate, to the positive terminals of the battery cells when the battery cell block is connected to the positive plate.

The positive lead frame(s) may be permanently connectable, through the openings in the positive plate, to the positive terminals of the battery cells when the battery cell block is connected to the positive plate by, for example, welding, such as laser welding.

The positive lead frame(s) may have a smaller wall thickness in comparison to the wall thickness of the Z-shaped busbars to improve the welding process. The wall thickness of the positive lead frames may correspond to the wall thickness of the battery cell cans of the battery cells to be permanently connected to the positive lead frames. The wall thickness of the positive lead frame(s) may be in a range of about 0.3 and about 0.5 mm. In one embodiment, the wall thickness of the positive lead frame(s) is 0.4 mm.

In one embodiment of the assembly set, at least one of the positive lead frames has a plurality of openings and, for each of the positive lead frames having the plurality of openings, the positions of these openings corresponding to the positions of the openings in the respective positive plate of Z-shaped busbar that are connectable with that positive lead frame when the positive lead frame is connected to this positive plate.

In one embodiment of the assembly set, at least one of the negative lead frames has a plurality of openings and, for each of the negative lead frames having the plurality of openings, the positions of these openings corresponding to the positions of the openings in the respective negative plate of Z-shaped busbar that are connectable with that negative lead frame when the negative lead frame is connected to this negative plate.

The openings in the positive lead frame and/or in the negative lead frame may allow for discharge of vent gases (e.g., in case of a thermal event, such as a thermal runaway) when the assembly set, together with a set of battery cell blocks, is assembled to a battery cell stack.

In one embodiment of the assembly set, a plurality of first chamfered pins is provided that protrude from the positive plate of at least one of the Z-shaped busbars to the side of the positive plate configured to be connected to the positive terminals of the battery cells of a battery cell block. The first chamfered pins are positioned such that each of the first chamfered pins penetrates (e.g., extends into) a gap between battery cells when the battery cell block is connected to the positive plate.

In one embodiment of the assembly set, a plurality of second chamfered pins is provided that protrude from the negative plate of at least one of the Z-shaped busbars to the side of the negative plate configured to be connected to the negative terminals of the battery cells of a further battery cell block. The second chamfered pins are positioned such that each of the second chamfered pins penetrates a gap between battery cells when the further battery cell block is connected to the negative plate.

The above-described embodiments having chamfered pins are useful for battery cell blocks including cylindrically shaped battery cells. The chamfered pins may act as holders to facilitate positioning of the battery cells during the process of connecting the battery cell block to the respective positive or negative plate. Also, the chamfered pins impede (or block) vent gases from flowing into the gaps between the individual battery cells of a battery cell block.

In one embodiment of the assembly set, for at least one of the Z-shaped busbars, a first pin frame is provided that is connectable to the positive plate of this Z-shaped busbar or, if present, to the positive lead frame connectable to the positive plate of this Z-shaped busbar. The first chamfered pins protrude from the first pin frame. The positive plate of this Z-shaped busbar and, if present, the positive lead frame connectable to that Z-shaped busbar has openings (e.g., bore-holes) through which the first chamfered pins of pin frame can be guided when connecting the first pin frame to the positive plate of that Z-shaped busbar or, if present, to the positive lead frame.

In one embodiment of the assembly set, for at least one of the Z-shaped busbars, a second pin frame is provided that is connectable to the negative plate this Z-shaped busbar or, if present, to the negative lead frame connectable to the negative plate of this Z-shaped busbar. The second chamfered pins protrude from the second pin frame. The negative plate of this Z-shaped busbar and, if present, the negative lead frame connectable to that Z-shaped busbar have openings (e.g., bore-holes) through which the second chamfered pins of pin frame can be guided when connecting the second pin frame to the negative plate of that Z-shaped busbar or, if present, to the negative lead frame.

In one embodiment of the assembly set, the first fastener of each of the Z-shaped busbars is (or includes) a strap, and each of the first fasteners of the first frame beam has a slot configured to engage with the first fastener of any one of the Z-shaped busbars.

In one embodiment of the assembly set, the second fastener of each of the Z-shaped busbars is (or includes) a strap, and each of the second fasteners of the second frame beam has a slot configured to engage with the second fastener of any one of the Z-shaped busbars.

In embodiments of the assembly set according to the present disclosure, straps are provided at the connection plate of at least one of the Z-shaped busbars. Additionally or alternatively, straps may be provided at the positive plate of at least one of the Z-shaped busbars. Additionally or alternatively, straps may be provided at the negative plate of at least one of the Z-shaped busbars.

In one embodiment, the assembly set further includes a plurality of rivets. The first fastener of each of the Z-shaped busbars has (or is) at least one opening (e.g., bore-hole), and each of the first fastening elements of the first frame beam is (or has) at least one opening (e.g., bore-hole) such that each of the first fastening elements is fixable to at least one of the first fasteners by inserting at least one rivet through one of the openings in the first fastening element and, at the same time, through one of the openings of the first fastener. Alternatively or additionally, the second fastener of each of the Z-shaped busbars is (or includes) at least one opening (e.g., bore-hole), and each of the second fastening elements of the second frame beam is (or includes) at least one opening (e.g., bore-hole) such that each of the second fastening elements is fixable to at least one of the second fasteners by inserting at least one rivet through one of the openings of the second fastening element and, at the same time, through one of the openings of the second fasteners.

In one embodiment, the assembly set further includes: a positive end busbar configured to be connected to the positive terminals of the battery cells of at least one battery cell block; and/or a negative end busbar configured to be connected to the negative terminals of the battery cells of at least one battery cell block.

Instead of the term "positive end busbar," the expression "first end busbar" may be used. Correspondingly, instead of the term "positive end busbar," the expression "first end busbar" may be used. The shape of the positive end busbar may correspond to the shape of a Z-shaped busbar as described before, however, the negative plate is omitted. Correspondingly, the shape of the negative end busbar may correspond to the shape of a Z-shaped busbar as described before, however, the positive plate is omitted.

A further embodiment of the disclosure relates to an assembly set for assembling a stack of battery cells, including the assembly set for assembling a carrier framework for a stack of battery cell blocks according to the disclosure and further includes: for each of the Z-shaped busbars, a battery cell block that is connectable, with the positive terminals of the battery cells of that battery cell block, to the positive plate of this Z-shaped busbar; one further battery cell block being connectable, with the negative terminals of the battery cells of that further battery cell block, to the negative plate of at least one of the Z-shaped busbars. The Z-shaped busbars and the battery cell blocks can be assembled such that each Z-shaped busbar is connected, with the positive plate of this Z-shaped busbar, to the positive terminals of the battery cells of one of the battery cell blocks and is further connected, with the negative plate of this Z-shaped busbar, to the negative terminals of the battery cells of another one of the battery cell blocks.

For example, when the number of Z-shaped busbars in the assembly set is N, then N+1 battery cell blocks may be present. In some embodiments, the N Z-shaped busbars may be shaped identically to each other. Also, the N+1 battery cell blocks may be shaped identically to each other. But the above-described assembly set with battery cell blocks also encompasses embodiments in which the Z-shaped busbars are not identical. For example, when the assembly set for assembling a stack of battery cells is in an assembled state, the Z-shaped busbars must be isolated from each other. The isolation may be realized, in the simplest case, by a gap between any two adjacent Z-shaped busbars such that these Z-shaped busbars do not contact to each other. Also, insulating materials may be used to isolate between any two adjacent Z-shaped busbars.

Each of the connections between battery terminals and a Z-shaped busbar may be realized by welding. In some embodiment, laser welding is used.

In one embodiment, an assembly set for assembling a stack of battery cells includes one or more battery cell bricks. The number of battery cell bricks corresponds to the number of Z-shaped busbars in the assembly set, and each battery cell brick includes a single one of the Z-shaped busbars that is pre-connected, with its positive plate, to the positive terminals of the battery cells of a single one of the battery cell blocks.

Other embodiments of an assembly set for assembling a stack of battery cells according to the present disclosure include one or more battery cell bricks. The number of battery cell bricks corresponds to the number of Z-shaped busbars in the assembly set, and each battery cell brick includes a single one of the Z-shaped busbars that is pre-connected, with its negative plate, to the negative terminals of the battery cells of a single one of the battery cell blocks.

A further embodiment of the present disclosure relates to a battery cell stack including the assembly set for assembling a stack of battery cells according to the present disclosure in which each Z-shaped busbar is connected, with the positive plate of this Z-shaped busbar, to the positive terminals of the battery cells of one of the battery cell blocks and is further connected, with the negative plate of this Z-shaped busbar, to the negative terminals of the battery cells of another one of the battery cell blocks. The first frame beam is connected to each of the Z-shaped busbars, and the second frame beam is connected to each of the Z-shaped busbars.

A further embodiment of the present disclosure relates to a vehicle including the battery cell stack according to an embodiment of the present disclosure.

A further embodiment of the present disclosure relates to a method for assembling a battery cell stack, the method including the steps of: a) providing a plurality of battery cell bricks, each battery cell brick including a Z-shaped busbar having a positive plate, a negative plate, and a connection plate, each battery cell brick further including a battery cell block, the positive terminals of the battery cells of that battery block being connected to the positive plate of one of the Z-shaped busbar, and each of the Z-busbars being fixable to a first frame beam and a second frame beam; b) providing one further battery cell block; c) providing the first frame beam and the second frame beam, the first and the second frame beam each being configured to be fixed to each of the Z-shaped busbars; d) connecting a first one of the battery cell bricks by connecting the negative plate of the Z-shaped busbar of the first one of the battery cell bricks to the negative terminals of the battery cells of the further battery cell block; e) connecting a further one of the battery cell bricks by connecting the negative plate of the Z-shaped busbar of that further one of the battery cell bricks to the negative terminals of the battery cells of the battery cell block of the battery cell brick that has been connected; f) repeating step e) until each of the battery cell bricks is connected; and g) fixing the first frame beam to each of the Z-shaped busbars and fixing the second frame beam to each of the Z-shaped busbars.

Above-described aspects of the present disclosure, or embodiments thereof, allow for:

Use of simple sheet-metal to realize the busbars, the sheet-metal combining structural support as well electrical connection.

Rigid Z-shape of the busbars, which can provide a self-supporting cell-carrier.

Improved safety design, the vertical wall of the "Z" separates all parallel cell-bricks from each other to prevent propagation in case of a venting event.

Uniform battery cell orientation.

Weldability, single cell bricks can be pre-bonded/pre-assembled.

Easy handling and better process capability due to smaller pre-assembly units (tolerance stack-up).

Improved cooling performance, such as when a cooling system is provided.

Modular application: length of the battery cell stack can be adjusted easily.

Good cell-to-package ratio with a higher functional and safety integration being achieved with fewer parts (e.g., lower costs), which facilitates the assembly.

Further aspects and features of the present disclosure can be learned from the dependent claims and/or the following description.

BRIEF DESCRIPTION OF THE DRAWINGS

Aspects and features of the present disclosure will become apparent to those of ordinary skill in the art by describing, in detail, embodiments thereof with reference to the attached drawings in which:

FIGS. 4A-4C schematically illustrate the process of assembling a stack of battery cell blocks according to an embodiment of the present disclosure;

FIGS. 6A-6F schematically illustrate the assembly of a battery cell stack according to an embodiment of the present disclosure;

FIGS. 8A-8D schematically illustrate the manufacture of a battery cell stack according to an embodiment of the present disclosure.

DETAILED DESCRIPTION

Figure 1:
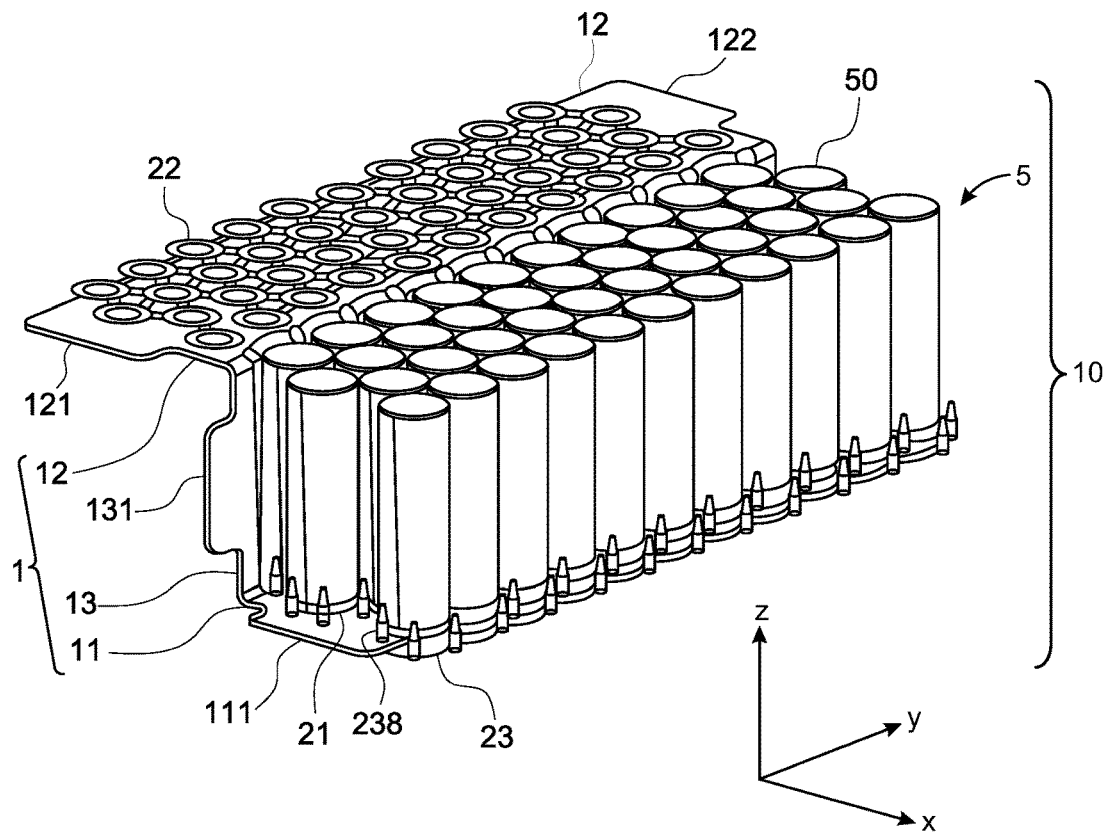
FIG. 1 is a schematic perspective view illustrating a cell brick configured to be assembled with parts of an assembly set according to an embodiment of the present disclosure.

Reference will now be made, in detail, to embodiments, examples of which are illustrated in the accompanying drawings. Aspects and features of the present disclosure, and implementation methods thereof, will be described with reference to the accompanying drawings. In the drawings, like reference numerals denote like elements, and redundant descriptions thereof may be omitted. Further, in the drawings, the relative sizes of elements, layers, and regions may be exaggerated for clarity. As used herein, the term "and/or" includes any and all combinations of one or more of the associated listed items. Further, the use of "may" when describing embodiments of the present disclosure refers to "one or more embodiments of the present disclosure."

It will be understood that although the terms "first" and "second" are used to describe various elements, these elements should not be limited by these terms. These terms are only used to distinguish one element from another element. For example, a first element may be named a second element and, similarly, a second element may be named a first element, without departing from the scope of the present disclosure.

In the following description of embodiments of the present disclosure, the terms of a singular form may include plural forms unless the context clearly indicates otherwise.

It will also be understood that when a film, a region, or an element is referred to as being "above" or "on" another film, region, or element, it can be directly on the other film, region, or element, or intervening films, regions, or elements may also be present.

Herein, the terms "upper" and "lower" are defined according to the z-axis. For example, the upper cover is positioned at the upper part of the z-axis, whereas the lower cover is positioned at the lower part thereof. In the drawings, the sizes of elements may be exaggerated for clarity. For example, in the drawings, the size or thickness of each element may be arbitrarily shown for illustrative purposes, and thus the embodiments of the present disclosure should not be construed as being limited thereto.

It will be understood that when an element or layer is referred to as being "on," "connected to," or "coupled to" another element or layer, it can be directly on, connected to, or coupled to the other element or layer, or one or more intervening elements or layers may be present. In addition, it will also be understood that when an element or layer is referred to as being "between" two elements or layers, it can be the only element or layer between the two elements or layers, or one or more intervening elements or layers may also be present.

Unless otherwise defined, all terms (including technical and scientific terms) used herein have the same meaning as commonly understood by one of ordinary skill in the art to which the present disclosure belongs. It will be further understood that terms, such as those defined in commonly used dictionaries, should be interpreted as having a meaning that is consistent with their meaning in the context of the relevant art and/or the present specification, and should not be interpreted in an idealized or overly formal sense, unless expressly so defined herein.

According to embodiments of the present disclosure, a busbar is shaped like a "Z". The busbar may be made of, for example, aluminum or copper. The Z-like shaped busbar provides a uniform top-down orientation of the battery cells, including when cylindrical cells are used, to improve the safety performance during a thermal runaway event and to facilitate the assembly of a battery cell stack, in particular the electrical connection of the cells. For example, due to the uniform orientation of the battery cells in a battery cell stack according to embodiments of the present disclosure, a cooling system may be located (or arranged) in the opposite position of venting openings in the cells, which should be on the top side of the cell stack. Additionally, the cooling behavior is improved due to the heat-flow through the vertical wall of the Z-shaped busbar, from the positive-terminal, which may be at the bottom side, of the cell, to the cooling plate, which may be at the top side, is improved greatly. Further, the vertical wall physically separates each serial-connected "cell brick" (denoting essentially a bundle of cells, which are connected to each other in parallel on one Z-shaped busbar); hence, thermal propagation between the individual cell bricks in the case of a venting event can be reduced or prevented. Even further, the Z shape itself is very rigid. As a result, additional supporting parts may be omitted because the Z-shaped busbar may be a structural part of the battery system.

Figure 2:
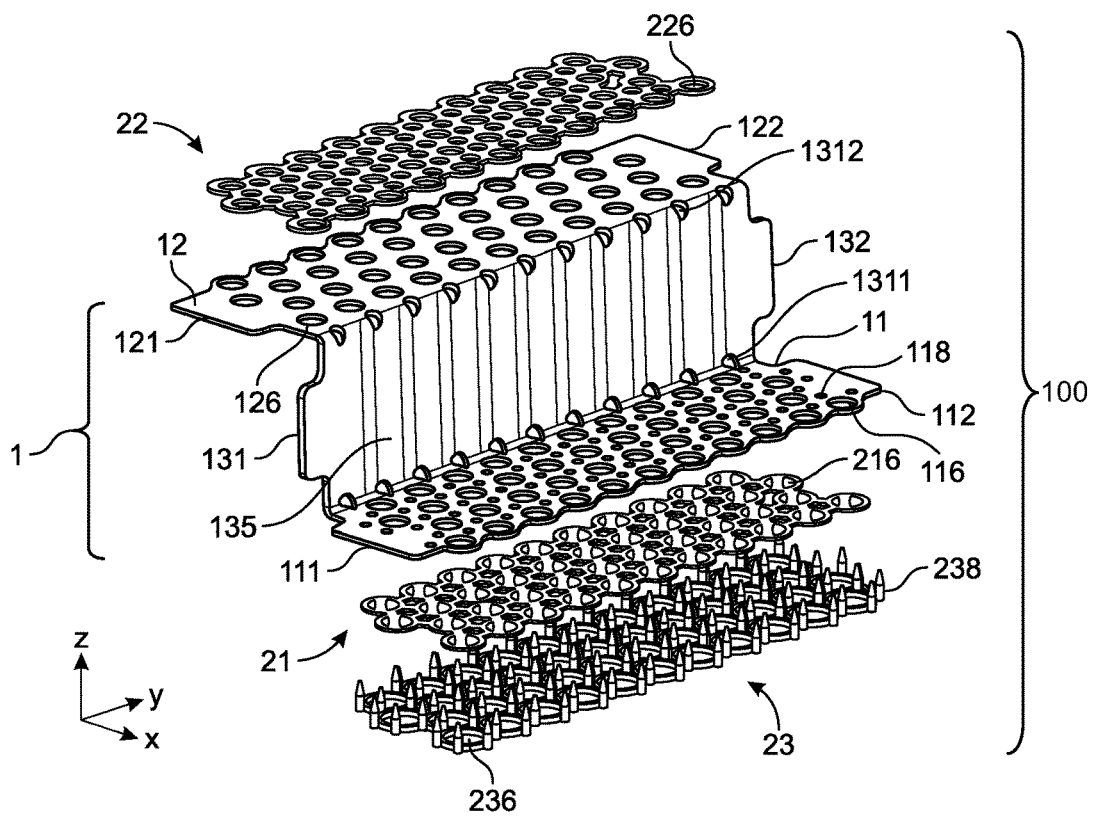
FIG. 2 is an exploded view of the cell brick illustrated in FIG. 1.

FIG. 1 is a perspective view of a cell brick 10 that is configured to be assembled with parts of an assembly set according to an embodiment of the present disclosure including a suitable block of battery cells 5 (hereinafter referred to as "battery cell block"). FIG. 2 is an exploded view of the cell brick 10 illustrated in FIG. 1 with the battery cell block 5 omitted. To facilitate the description, a Cartesian coordinate system with x, y, and z axes is also provided in FIGS. 1 and 2. A battery cell stack according to an embodiment of the disclosure, for example, an assembly set for assembling a carrier framework for a stack of battery cell blocks, which is completely assembled together with a number of battery cell blocks, will be described below with reference to FIGS. 6-8.

Referring to FIG. 1, the battery cell block 5 includes 42 identically shaped battery cells 50. Each of the battery cells 50 has a cylindrical shape and extends, in the Figure, along the z-direction. In the battery cell block 5, the battery cells 50 are packed together as close as possible. For example, except for the battery cells 50 at the edge of battery cell block 5, each of the battery cells 50 is surrounded by (e.g., surrounded on a plane by) six other battery cells 50 according to a 6-fold symmetry. Further, all battery cells 50 of the battery cell block 5 are orientated such that their positive terminals (PLUS-terminals) are positioned at their respective bottom ends in the Figure. Accordingly, the negative terminal (MINUS-terminal) of each of the battery cells 50 of battery cell block 5 is located at the upper end of the respective battery cell 50 in the Figure.

As shown in FIGS. 1 and 2, the illustrated cell brick 10 includes a busbar 1 having a Z-like shape. For example, the busbar 1 has a profile or cross-section that is approximately shaped like a Z. In FIGS. 1 and 2, this profile or cross-section extends along a plane parallel to the x-z-plane of the depicted coordinate system. The busbar 1 has three parts, each having a planar shape: A first part, referred to as a first plate or positive plate 11, extends, in the figures, parallel to the x-y-plane of the coordinate system and is sized to cover a cross-section (along the x-y-plane of the coordinate system) of the battery cell block 5. For example, the positive plate 11 mechanically and electrically connects to each of the positive terminals of the battery cells 50 of the battery cell block 5. In other words, the busbar 1 and the battery cell block 5 may be assembled such that each of the battery cells 50 abuts against an upper side of positive plate 11 as shown in FIG. 1.

A second part of the busbar 1, referred to as a second plate or negative plate 12, extends, in the figures, parallel to the x-y-plane of the coordinate system and, similar to the positive plate 11, cover a cross-section (along the x-y-plane of the coordinate system) of a further (e.g., a second) battery cell block, which is shaped and orientated identically to the battery cell block 5. For example, the negative plate 12 mechanically and electrically connects to each of the negative terminals of the battery cells of said further battery cell block. In other words, the busbar 1 and the further battery cell block may be assembled such that each of the battery cells of the further battery cell block abuts against a lower side of negative plate 12 when the negative plate 12 is orientated as shown in FIG. 1.

Both the positive plate 11 and the negative plate 12 may have an approximately rectangular shape (except, possibly, for fastening elements and/or a plurality of openings in the respective plate). At least along the x-direction, the dimension of the positive plate 11 as well as of the negative plate 12 should not or only very little exceed the respective dimension of battery cell block 5 when the busbar 1 and the battery cell block 5 are arranged as depicted in FIG. 1 to keep the dimensions of the complete battery cell stack assembled of several cell bricks 10 as shown in FIG. 1 as small as possible. For example, when sticking or plugging a multiplicity of cell bricks as shown in FIG. 1 to one another along the x-direction as described in more detail below with reference to FIGS. 6-8, any two adjacent battery cell blocks are spatially as close together as possible.

The third part of the busbar 1, referred to as a connection plate 13, extends, in the figures, parallel to the y-z-plane. It has an approximately rectangular shape (except, possibly, for fastening elements and/or a plurality of openings in the respective plate) and is sized such that its breadth (e.g., it's extension along the y-direction) corresponds essentially to the respective breadths of the positive plate 11 and the negative plate 12 and that its height (e.g., its extension along the y-direction) corresponds essentially to the height of the battery cell block 5 (e.g., the length of each of the battery cells 50).

As shown in FIG. 2, the connection plate 13 may not be perfectly planar but may be corrugated; for example, the connection plate 13 may include grooves (or recesses or embayments) 135. The grooves 135 are each configured to receive a part of the cylindrically shaped surface of the battery cells 50 that abut against the face of the connection plate 13 as shown in, for example, FIG. 2, when the battery cell block 5 is assembled with the busbar 1 as illustrated in FIG. 1. Thus, the grooves 135 may be relatively small. The surface of the connection plate 13 that is not visible in FIG. 2 (i.e., the surface of connection plate 13 opposite to the surface thereof visible in FIG. 2), may have corresponding grooves (or recesses or embayments). For example, the profile or cross-section of the connection plate 13 may exhibit an approximately sinusoidal shape when viewed in the x-y-plane. The afore-described geometry of the connection plate 13 may improve the compactness of the assembled stack of battery cell blocks (e.g., in the x-direction) including a plurality of cell bricks 10 as shown in FIGS. 1 and 2.

Because the busbar 1 is provided for conducting electric current, it may be made of an electrically conductive material. However, in the assembled stack of battery cell blocks, the (plurality of) busbars 1 provide not only an electric connection but also appropriate structural rigidity of the stack of battery cell blocks 5. Thus, the busbar 1 may be made of metal. For example, the busbar 1 may be made of copper or iron. In some embodiments, the busbar 1 is made of a high-strength aluminum alloy (Al-alloy). The thickness of the busbar 1 (e.g., the wall thickness of each of the positive plate 11, the negative plate 12, and the connection plate 13) may be in a range of about 1 mm to about 2 mm. In some embodiments, the thickness may be smaller or greater depending on the desired structural stability for a specific stack of battery cell blocks 5. In one embodiment, the thickness is about 1.5 mm.

The three parts of busbar 1—the positive plate 11, the negative plate 12, and the connection plate 13—may originally be separated parts (e.g., may be separately formed) and then welded together to form the busbar 1. In some embodiments, however, the busbar 1 is integrally formed (e.g., is made from one piece). For example, the busbar 1 may be made from one elongated sheet of metal, the ends of which are bent or angled (e.g., are formed by, for example, stamping) in opposite directions with respect to the middle part of the sheet of metal. In embodiments in which the busbar 1 is formed integrally from a bent sheet of metal, a plurality of openings 1311, 1312 may be inserted (e.g., formed or punched) into the sheet of metal along the lines at which the sheet of metal is to be bent during the manufacture process of the busbar 1.

The busbar 1 may be shaped such that the plane in which the positive plate 11 extends is substantially parallel to the plane in which the negative plate 12 extends. In one embodiment, the connection plate 13 extends in a plane perpendicular to the planes in which the positive plate 11 and the negative plate 12, respectively, extend. For example, the positive plate 11 is orientated perpendicular to the connection plate 13, and the negative plate 12 is similarly orientated perpendicular to the connection plate 13. The connection plate 13 extends between the positive plate 11 and the negative plate 12, and the positive plate 11 and the negative plate 12 protrude in opposite directions from the connection plate 13. The afore-described geometry of the busbar 1 improves the compactness of the assembled stack of battery cell blocks 5, provided that the battery cell blocks 5 each have a shape in which the cylindrical battery cells 50 each extend perpendicular to the plane in which the positive terminals of the battery cells 50 are arranged and also perpendicular to the plane in which the negative terminals of the battery cells 50 are arranged. Although the profile or cross-section of the busbar 1 taken parallel to the x-z-plane of the depicted coordinate system does not perfectly resemble the letter Z (because the middle line of the letter Z reaches the lower bar and the upper bar of the letter Z in angles unequal to 90°), the term "Z-shaped" will nevertheless be used throughout this description and the claims to encompass at least the afore-described geometry of the busbar 1 for the sake of simplicity.

In some embodiments, the openings 116 are formed within the positive plate 11 of the busbar 1. Alternatively or additionally, openings 126 may be formed within the negative plate 12. The openings 116, 126 may facilitate the connection (e.g., the electric and/or mechanical connection) of the respective terminals of the battery cells 50 of the battery cell blocks 5 to the plates 11, 12.

While the electric connection between the positive terminals of the battery cells 50 the battery cell block 5 and the positive plate 11 may be established by mere tangency (e.g., by location and/or contact), the mechanical connection between these members may be more difficult to realize. The same holds for the electric and mechanical connection between the negative terminals of the battery cells 50 of another battery cell block 5 and the negative plate 12 of the busbar 1. For example, in some embodiments, the respective mechanical connections between the battery cell terminals and the respective plates 11, 12 of the busbar 1 are established by welding (e.g., laser welding) but the battery cell terminals may not able to be directly welded to the respective plate 11, 12 of the busbar 1 due to the different thicknesses of the plates 11, 12 and the battery cell cans (battery cell housings) because the energy necessary to sufficiently weld the plates 11, 12 of the busbar 1 would be so intense that it could destroy the can of the battery cells 50.

Thus, in some embodiments, a busbar assembly 100, which includes the busbar 1, is provided. The busbar assembly 100 further includes a first lead frame (e.g., a positive lead frame) 21 and/or a second lead frame (e.g., a negative lead frame) 22.

In embodiments of an assembly set according to the present disclosure, which includes the busbar assembly 100 including the negative lead frame 22, the negative plate 12 of the Z-shaped busbar 1 has the openings 126 as described above. With reference to FIGS. 1 and 2, the negative plate 12 is configured such that a battery cell block 5 is connectable from below to the negative plate 12 (e.g., the battery cell block 5 may be orientated such that the negative terminals of its battery cells 50 are arranged at its upper side), the negative plate 12 is configured to be connected, at its upper surface, to the negative lead frame 22. Then, the negative lead frame 22 can be connected, through the openings 126 of the negative plate 12, to the negative terminals of the battery cells 50 of the battery cell block 5, which is to be connected to the negative plate 12.

This connection between the negative plate 12 and the negative terminals of the battery cells 50 of the battery cell block 5 to be connected to the negative plate 12 is performed by welding (e.g., by laser welding). To be welded, the negative lead frame 22 is made of a weldable material. For example, the negative lead frame 22 may be made of metal. The negative lead frame 22 may be made of the same material as the Z-shaped busbar 1. For example, the material of the negative lead frame 22 may be copper, iron, or aluminum, or an alloy including at least one of these materials. In some embodiments, the alloy material may be chosen according to the laser welding process to be used. The cans of the battery cells and the negative lead frame 22 may have approximately the same wall thickness to facilitate the welding process. For example, the thickness of the negative lead frame 22 may be in a range of about 0.3 to about 0.5 mm. In one embodiment, the thickness of the negative lead frame is about 0.4 mm.

In some embodiments, the negative lead frame 22 has openings 226. The number of openings 226 in the negative lead frame 22 may be equal to the number of openings 126 in the negative plate 12. Accordingly, the positions of the openings 226 within the negative lead frame 22 may correspond, with reference to a plane parallel to the x-y-plane of the coordinate system, to the positions of the openings 126 within the negative plate 12 when the negative lead frame 22 is connected at the upper side of negative plate 12 as depicted in FIG. 1. The openings 226 in the negative lead frame 22 may facilitate the welding process and/or may also provide for vent gas drainage.

The assembly set according embodiments of to the present disclosure may include (alternatively or additionally to the negative lead frame 22) a positive lead frame 21. In such embodiments, the positive plate 11 of the Z-shaped busbar 1 has the openings 116 as described above. While, with regard to FIGS. 1 and 2, the positive plate 11 is configured such that the battery cell block 5 is connectable from above to the positive plate 11 (e.g., the battery cell block 5 is orientated such that the positive terminals of its battery cells 50 are arranged at its lower side), the positive plate 11 is configured to be connected with its lower surface to the positive lead frame 21. Then, the positive lead frame 21 can be connected, through the openings 116 in the positive plate 11, to the positive terminals of the battery cells 50 of the battery cell block 5, which is to be connected to the positive plate 11.

The afore-described connection between the positive plate 11 and the positive terminals of the battery cells 50 of the battery block 5 is performed by welding (e.g., by laser welding). To be welded, the positive lead frame 21 is made of a weldable material. For example, the positive lead frame 21 may be made of metal. The positive lead frame 21 may be made of the same material as the Z-shaped busbar 1. For example, the material of the positive lead frame 21 may be copper, iron, or aluminum, or an alloy including at least one of these materials. In some embodiments, the alloy material may be chosen according to the laser welding process. The cans of the battery cells 50 and the positive lead frame 21 may have approximately the same wall thickness to facilitate the welding process. For example, the thickness of the positive lead frame 21 may be in a range of about 0.3 to about 0.5 mm. In one embodiment, the thickness of the positive lead frame is about 0.4 mm.

In some embodiments, the positive lead frame 21 has openings 216. These openings 216 may be grouped so that a plurality of openings (e.g., a predefined number of openings, such as three openings) may together form a group of openings (e.g., an opening group) 2160. This will be described in more detail below with reference to FIG. 3. The number of opening groups in the positive lead frame 21 may be equal to the number of openings 126 in positive plate 11. Then, the positions of the opening groups within the positive lead frame 21 may correspond, with reference to a plane parallel to the x-y-plane of the coordinate system, to the positions of the openings 116 within the positive plate 11 when the positive lead frame 21 is connected at the lower side of positive plate 11 as shown in FIG. 2. The openings 216 in the positive lead frame 21 may facilitate the welding process and/or may provide for vent gas drainage (see, e.g., FIG. 3).

In some embodiments, the busbar assembly 100 includes both the negative lead frame 22 and the positive lead frame 21.

In addition to the one or two lead frames 21, 22 described above, the busbar assembly 100 may include chamfered pins 238. The chamfered pins 238 may improve the positioning of the single battery cells 50 when the battery cell block 5 is connected to the positive plate 11 as shown in FIGS. 1 and 2. However, the chamfered pins 238 may also guide vent gases in case of thermal events (e.g., thermal run-away); this will be described below in more detail with reference to FIG. 3.

In the busbar assembly 100 illustrated in FIGS. 1 and 2, the chamfered pins 238 are provided at the positive plate 11 of Z-shaped busbar 1. To facilitate the assembly, the chamfered pins 238 protrude from one side of a pin frame 23. The pin frame 23 is configured to be attached—directly or indirectly—from below, with reference to the figures, to the positive plate 11. In the illustrated embodiment, the pin frame 23 is indirectly attached to the positive plate 11 because the positive lead frame 21 is sandwiched between the positive plate 11 and the pin frame 23 during the assembly process. The positive plate 11 has a plurality of further openings 118 such that each of the chamfered pins 238 can be led through (e.g., can extend through) one of the further openings 118 during the process of attaching the pin frame 23 to the positive plate 11 from below. As a result, the tips of the chamfered pins 238 protrude from the upper side of the positive plate 11 into the space (e.g., the indentations) for receiving the battery cell block 5. Thus, when the battery cell block 5 is connected to the positive plate 11 as illustrated in FIGS. 1 and 2, the battery cell block 5 can only be positioned on the upper side of positive plate 11 such that the tips of chamfered pins 238 engage into the gaps between the cylindrical battery cells 50 of the battery cell block 5. Due to the arrangement of the battery cells 50 within the battery cell block 5, each of the inner battery cells 50 of the battery cell block 5 is surrounded (e.g., is surrounded on a plane) by six gaps. Accordingly, the chamfered pins 238 are arranged in a 6-fold rotational symmetry around each of the inner ones of openings 116 (that is, other than the openings 116 that are closest to an edge of the positive plate 11) in the embodiment of the busbar assembly 100 illustrated in FIGS. 1 and 2.

The material of the pin frame 23 may be copper, iron, or aluminum, or an alloy including at least one of these materials. In some embodiments, the material of pin frame 23 is the same material as is used for the manufacture of the positive lead frame 21, which is sandwiched between the pin frame 23 and the positive plate 11. However, the pin frame 23 may also be made from a plastic. Pin frame 23 may be attached by welding (e.g., laser welding) to the lower side of the positive lead frame 21. Alternatively or additionally, pin frame 23 may be connected to the busbar assembly 100 via a plug connection between the chamfered pins 238 and the respective further openings 118 provided in the positive plate 11.

Further, openings 236 may be provided in the pin frame 23. When pin frame 23 is attached from below to the positive plate 11 (thereby sandwiching, in some embodiments, the positive lead frame 21), the positions of the openings 236 in the pin frame 23 correspond, with reference to a plane parallel to the x-y-plane of the coordinate system, to the positions of the openings 116 in the positive plate 11.

Because the parts illustrated in FIG. 2 (e.g., the Z-shaped busbar 1, the positive lead frame 21, the negative lead frame 22, and the pin frame 23) can be easily welded together (e.g., by laser welding), the busbar assembly 100 including the afore-mentioned parts can be manufactured and delivered in a pre-assembled condition. Similarly, the entire cell brick 10 as illustrated in FIG. 1 and including the parts shown in FIG. 2, together with one battery cell block 5, can be manufactured and delivered in a pre-assemblage (or pre-assembly) condition.

However, the cell-interface area may be thinned to ensure appropriate laser welding process capability. In such cases, there is no need for the lead-frame parts, such as the positive lead frame 21 and/or the negative lead frame 22, as described above. Accordingly, in some embodiments of the assembly set according to the present disclosure, the lead frames 21, 22 may be omitted.

In some embodiments, the Z-shaped busbar 1 further includes tabs or straps, which facilitate fastening or fixing of the Z-shaped busbar 1, or the complete busbar assembly 100, to frame beams, as will described below with reference to, for example, FIGS. 6 to 8. For example, the positive plate 11 may include a first positive plate strap 111 and a second positive plate strap 112, the negative plates 12 may include a first negative plate strap 121 and a second negative plates strap 122, and the connection plate 13 may include a first connection plate strap 131 and a second connection plate strap 132.

Figure 3A:
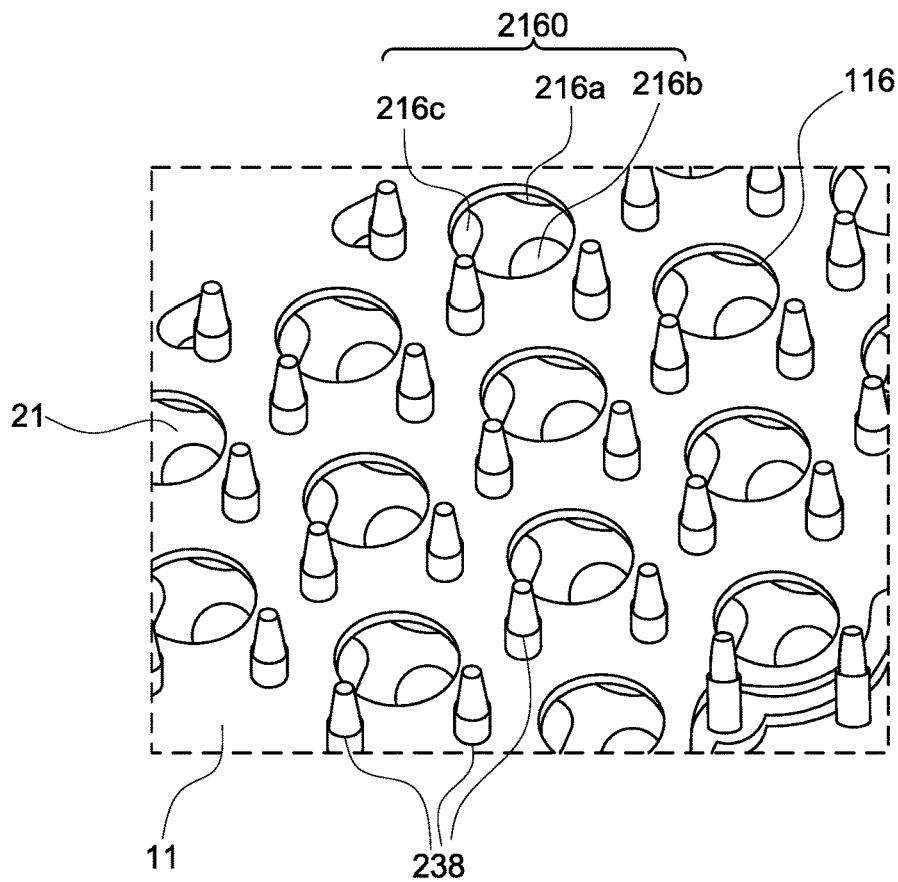
FIGS. 3A and 3B show, schematically, region of a positive plate in the assembled assembly set.

FIG. 3A shows, schematically, a region of the positive plate 11 in the assembled busbar assembly 100 as described above with reference to FIGS. 1 and 2. Visible through the openings 116 in the positive plate 11, the positive lead frame 21 is attached from below to the positive plate 11. As shown in, for example, FIG. 2, the pin frame 23 is attached, in turn, from below to the positive lead frame 21 such that the latter is sandwiched between pin frame 23 and positive plate 11. The openings 216 in the positive lead frame 21 are located directly below each of the openings 116. Also, openings 236 in the pin frame 23 are located below each of the openings 116 in the positive plate 11. Thus, the arrangement of the openings 116, 216, 236 enable gas flow (e.g., provide a gas flow passage) through the positive plate 11, the positive lead frame 21, and the pin frame 23 via the openings 116 in the positive plate 11, the openings 216 in the positive lead frame 21, and the openings 236 in the pin frame 23.

Under each of the openings 116 in the positive plate 11 (and, although not visible in FIG. 3A, above each of the openings 236 in the pin frame 23) are grouped three openings 216a, 216b, 216c in the positive lead frame 21. Any three of those grouped openings 216a, 216b, 216c together form an opening group 2160. The material of the positive lead frame 21 separating the openings 216a, 216b, 216c from each other is, thus, provided in the assembled busbar assembly 100 below the opening 116 in the positive plate 11. This material (having a star-like shape including three bars in the embodiment illustrated in FIG. 3B) can be welded to the positive terminal of the battery cell 50, which becomes connectors from above to the upper side of the positive plate 11 when the busbar assembly 100 is assembled.

The 6-fold rotational symmetry in which the chamfered pins 238 are arranged around any one of the openings 116 (except for the openings 116 positioned at the edges of the positive plate 11), which has been described above with respect to FIG. 2, is also shown in FIG. 3A. The chamfered pins 238 may facilitate the alignment of the battery cells 50 when the battery cell block 5 is connected to the upper side of the positive plate 11 as described above with reference to FIGS. 1 and 2.

Figure 3B:
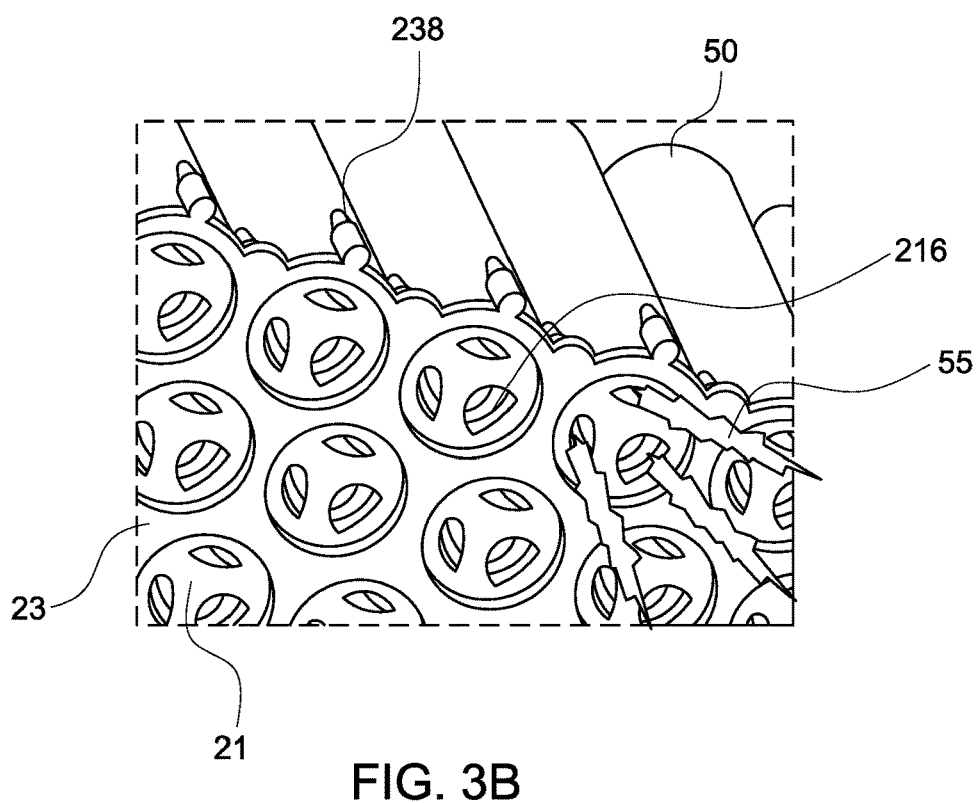

FIG. 3B shows, schematically, a region of the pin frame 23 in the assembled busbar assembly 100, which has been connected to the positive terminals of the battery cells 50 of the battery cell block 5 as described above with reference to FIGS. 1 and 2. If a thermal event, such as a thermal run-away, occurs in one or more of the battery cells 50 of the battery cell block 5, hot vent gas 55 (symbolized in FIG. 3B by a flame-symbol) may escape with high pressure out of the positive terminal of the affected battery cell(s) 50. The afore-described geometry of the busbar assembly 100 (including the positioning of the openings in the positive plate 11, the positive lead frame 21, and the pin frame 23) allows for efficient discharge of the vent gas from the affected battery cells 50 and the battery cell block 5.

However, the individual battery cells 50 may not be rotationally aligned. Therefore, the degassing openings of the battery cells 50 may be covered by the bars of the positive lead frame 21 that separate the openings 216a, 216b, 216c in the opening group 2160 in the positive lead frame 21 from each other (see the above description with respect to FIG. 3A). Because the battery cells 50 are not sealed against the Z-shaped busbar 1, the vent gas flow can be diverted upwardly (e.g, in the positive z-direction with respect to the coordinate system of FIGS. 1 and 2) between the battery cells 50. The chamfered pins 238 of the pin frame 23, however, prevent the vent gas from flowing into the gaps between the battery cells 50.

FIGS. 4A-4C schematically illustrate the process of assembling a stack 6 of battery cell blocks 5 by using a plurality of the busbar assemblies 100 as shown in, for example, FIG. 2 together with a plurality of battery cell blocks 5 as depicted in, for example, FIG. 1. The coordinate system depicted in FIG. 4C also applies to each of FIGS. 4A and 4B. This coordinate system indicates the orientation of busbar assemblies 100 and the battery cell blocks 5 in the same way as in FIGS. 1 and 2. In one embodiment of the manufacture process, a first step S1 (see, e.g., FIG. 4A) of the manufacture process includes assembling a "battery cell brick" 10 (in the following referred to as "cell brick" 10). In the illustrated embodiment, the busbar assembly 100 is already (pre-)assembled. Then, the first step S1 (see, e.g., FIG. 4A) includes the connection of a battery cell block 5 to the positive plate 11 (see, e.g., FIG. 2) of a busbar assembly 100. For example, the battery cell block 5 includes a bundle of battery cells 50 (in the illustration, a bundle of 42 battery cells is shown), and each of the battery cells 50 is orientated such that its positive terminal is arranged at its bottom end and negative terminal is arranged at its top end. Then, in a first sub-step S11 of the first step S1, the battery cell block 5 is positioned onto the upper side of the positive plate 11 of the Z-shaped busbar 1 (see, e.g., FIG. 2) of the busbar assembly 100. This is indicated by the arrow orientated toward the bottom in FIG. 4A. Next, in a second sub-step S12 of the first step S1, the positive terminals of the battery cells 50 of the battery cell block 5 are each welded to the positive plate 11 of the Z-shaped busbar 1. The welding process is symbolized in FIG. 4A by a flame. In some embodiments, the welding process is a laser welding process. The laser is indicated in FIG. 4A by laser beam L1. The laser beam L1 is directed from below to the assembly (with respect to the figure) and causes a welding (or welded) connection between the material of the positive lead frame 21 (see, e.g., FIG. 2) and the positive terminals of the battery cells 50 of the battery cell block 5 through the openings 116 in the positive plate 11 (see, e.g., FIG. 2). The result of manufacture step S1 is an assembled cell brick 10 as depicted in FIG. 1.

For the following second step S2 (see, e.g., FIG. 4B) of the manufacture process, a number (e.g., a predetermined or predefined number) of cell bricks 10 are provided. In FIG. 4B, five cell bricks 101, 102, 103, 104, 105 are illustrated, but the number of cell bricks 10 may be different and may be greater than five (e.g., the number of cell bricks 10 according to FIGS. 1 and 4A in the assembled stack 6 of battery cell blocks 5 shown in FIG. 4C is 15). First, a starting battery cell block $5_0$ to begin is provided. The starting battery cell block $5_0$ is not in a cell brick 10 according to FIG. 1. For example, the starting battery cell block $5_0$ is equipped with a first end busbar (e.g., a positive end busbar) E1, which may act as the positive terminal of the complete stack 6 of battery cell blocks 5 shown in FIG. 4C. The positive end busbar E1 is therefore (at least electrically) connected to the positive terminals of the battery cells 50 of the first battery cell block 5 (viewed along the x-direction) in the stack 6 of battery cells blocks 5 depicted in FIG. 4C. The starting battery cell block $5_0$ together with the positive end busbar E1 may be provided together in a pre-assembled condition as an initial cell brick $10_0$. Then, the negative terminals of the battery cells 50 in the starting battery cell block $5_0$ are (detachably) connected with the bottom side of the negative plate 12 of the Z-shaped busbar 1 (see, e.g., FIGS. 1 and 2) in a first cell brick $10_1$. Subsequently, the negative terminals of the battery cells 50 in the first cell brick $10_1$ are (detachably) connected with the bottom side of the negative plate 12 of the Z-shaped busbar 1 in a second cell brick $10_2$. This procedure is indicated by the arrow P2 in FIG. 4B. The process is then repeated for the remaining cell bricks (as shown in FIG. 4B, for the further cell bricks $10_3$, $10_4$, and $10_5$ as indicated by the arrows P3, P4, and P5) until each of the cell bricks 10 are positioned as illustrated in FIG. 4C.

After performing step S2, each of the cell bricks 10 is arranged in the correct position to form the assembled stack 6 of battery cell blocks 5 (see, e.g., FIG. 4C) and already loosely connected to an adjacent cell brick 10, but the individual cell bricks 10 (and the starting battery cell block $5_0$) are not yet connected to each other in a secure (e.g., permanent) manner. To achieve a secure (or permanent) connection between the cell bricks 10 (including the initial cell brick 100) in the stack 6 of battery cell blocks 5, a third step S3 of the manufacture process is performed, which is shown in, for example, FIG. 4C.

When a number N of cell bricks 10 is to be assembled into the stack 6 of battery cell blocks 10 (wherein the initial cell brick $10_0$ is not counted), N permanent connections will be established, and each of these connections will be established between one of the battery cell blocks 10 and the negative plate 12 of the Z-shaped busbar 1. To that end, N sub-steps are performed. In each of these N sub-steps, the negative terminals of the battery cells 50 in a battery cell block 10 of an individual cell brick 5 are permanently connected to the negative plate 12 of the Z-shaped busbar 1 in an adjacent cell brick 10. These permanent connections may be established by welding, such as by laser welding. One of these sub-steps is shown in, for example, FIG. 4C as sub-step S3n. In sub-step S3n, a laser beam L3 is directed from above onto the negative lead frame 22 (see, e.g., FIGS. 1 and 2) in the busbar assembly 100, which is in one of the cell bricks 10 in the stack 6 of the battery cell blocks 5. Thus, the material of the negative lead frame 22 is then welded to the negative terminals of the battery cells 50 of the battery cell block 5 positioned below the corresponding negative lead frame 22 through the openings 126 in the negative plate 12. The welding process of sub-step S3n is symbolized in FIG. 4C by the flame symbol, and the laser is indicated by laser beam L3.

Also visible in the stack 6 of the battery cell blocks 5 illustrated in FIG. 4C is a second end busbar (e.g., a negative end busbar) E2, which may act as the negative terminal of the entire stack 6 of battery cell blocks 5. The negative end busbar E2 is therefore (at least electrically) connected to the negative terminals of the battery cells 50 of the last battery cell block 5 (viewed along the x-direction) in the stack 6 of battery cells blocks 5.

Figure 5:
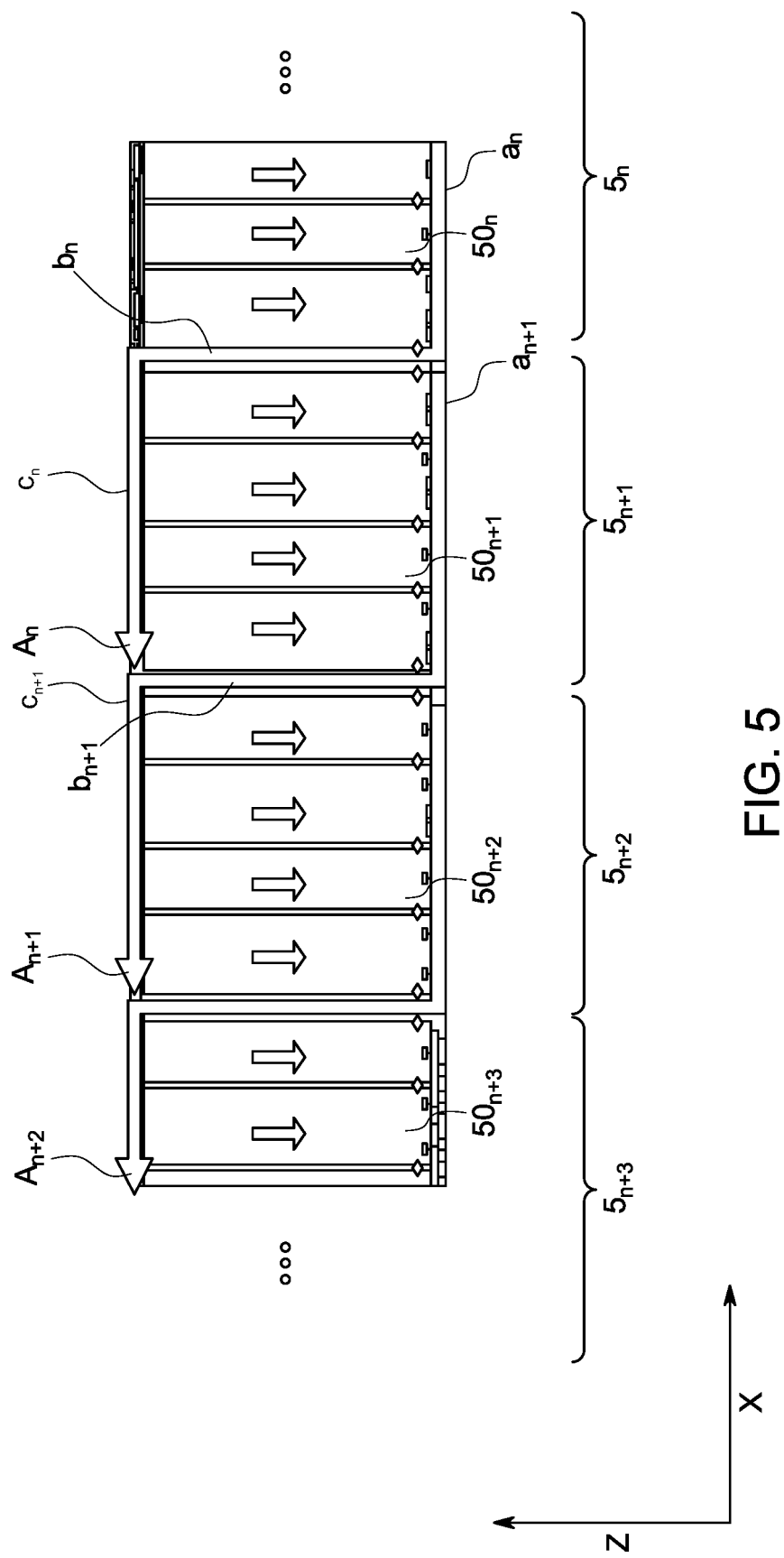
FIG. 5 schematically illustrates the path of electric current in a battery cell stack according to an embodiment of the present disclosure.

FIG. 5 schematically illustrates the path of electric current and the direction of the current flow (the "technical current flow direction") in a battery cell stack 5 according to embodiments of the present disclosure (e.g., in a battery cell stack 5 including the assembly set for assembling a carrier framework for a stack 6 of battery cell blocks 5 according to an embodiment of the present disclosure). In FIG. 5, four battery cell blocks $5_n$, $5_{n+1}$, $5_{n+2}$, $5_{n+3}$ are illustrated arranged in an X-direction of a two-dimensional coordinate system depicted in FIG. 5. The x- and z-axes of this coordinate system are consistent with the x- and z-axes of the coordinate system shown in FIG. 4. The battery cell blocks $5_n$, $5_{n+1}$, $5_{n+2}$, $5_{n+3}$ shown in FIG. 5 may be any four adjacent battery cell blocks 5 in the stack 6 of battery cell blocks 5 shown in FIG. 4C. Each of the battery cell blocks $5_n$, $5_{n+1}$, $5_{n+2}$, $5_{n+3}$ include four battery cells. The first battery cell block $5_n$ and last battery cell block $5_{n+3}$ (viewed in the direction x), however, are only partially shown. Each of the battery cells 50 in each of the battery cell blocks 5 is orientated such that its positive terminal is located at the lower end of the battery cell 50 and its negative terminal is located at the upper end of the battery cell 50. Each battery cell block 5 amplifies the voltage between the end terminals of the stack 6 of battery cell blocks 5, and these end terminals may be provided by (or may be) the first and second end busbars E1, E2 as shown in, for example, FIGS. 4 and 7A. Although the electrochemical reactions in a battery cell are more complex than a simple current flow, a battery cell can be viewed as a component through which electric current flows as indicated by the arrows (orientated from top to bottom) depicted in each of the shown battery cells 50 as would be understood by one of ordinary skill in the art.

The four battery cell blocks $5_n$, $5_{n+1}$, $5_{n+2}$, $5_{n+3}$ are connected to each other in series via three Z-shaped busbars 1 or busbar assemblies 100 as described above with respect to, for example, FIGS. 1 and 2. The profiles or cross-sections of the Z-shaped busbars 1 or busbar assemblies 100 correspond to the shape of the Z-shaped arrows $A_n$, $A_{n+1}$, and $A_{n+2}$, respectively, shown in FIG. 5. The arrows $A_n$, $A_{n+1}$, and $A_{n+2}$ will be described in more detail below. For example, the positive plate 11 of the Z-shaped busbar 1 connecting the n-th battery cell block $5_n$ with the (n+1)-th battery cell block $5_{n+1}$ corresponds to the lower horizontal part an of arrow $A_n$, and the positive plate 11 of the Z-shaped busbar 1 connecting the (n+1)-th battery cell block $5_{n+1}$ with the (n+2)-th battery cell block $5_{n+2}$ corresponds to the lower horizontal part $a_{n+1}$ of arrow $A_{n+1}$. Correspondingly, the negative plate 12 of the Z-shaped busbar 1 connecting the n-th battery cell block $5_n$ with the (n+1)-th battery cell block $5_{n+1}$ corresponds to the upper horizontal part $c_n$ of arrow $A_n$, and the negative plate 12 of the Z-shaped busbar 1 connecting the (n+1)-th battery cell block $5_{n+1}$ with the (n+2)-th battery cell block $5_{n+2}$ corresponds to the upper horizontal part $c_{n+1}$ of arrow $A_{n+1}$.

Then, the positive terminals of the battery cells $50_n$ of n-th battery cell block $5_n$ act as a current source that supplies electric current to the positive plate 11 of the Z-shaped busbar 1 corresponding to arrow $A_n$, the positive plate 11 being located at the position of lower horizontal part an of the Z-shaped arrow $A_n$. Furthermore, the negative terminals of the battery cells $50_{n+1}$ of the battery cell block $5_{n+1}$ adjacent to the battery cell block $5_n$ (viewed in the direction x) are connected to the negative plate 12 of that Z-shaped busbar 1. Thus, due to the electric potential established between the positive terminals of the battery cells $50_n$ and the negative terminals of the battery cells $50_{n+1}$, an electric current will be established in the Z-shaped busbar 1 connecting the positive terminals of the battery cells $50_n$ and the negative terminals of the battery cells $50_{n+1}$. The direction of this electric current is indicated in FIG. 5 by arrow $A_n$ (e.g., the electric current is collected at the lower horizontal part an of the Z-shaped arrow $A_n$ and subsequently led, via the vertical part $b_n$ of arrow $A_n$, to the upper horizontal part $c_n$ of arrow $A_n$, the position of the upper horizontal part $c_n$ corresponding to the position of the negative plate 12 of the Z-shaped busbar 1 connecting the positive terminals of the battery cells $50_n$ and the negative terminals of the battery cells $50_{n+1}$).

The (n+1)-th battery cell block $5_{n+1}$ is arranged such that its battery cells $50_{n+1}$ are connected, with their negative terminals, to the negative plate 12 of the Z-shaped busbar 1 located at the position of arrow $A_n$ and are further connected, with their positive terminals, to the positive plate 11 of the Z-shaped busbar 1 located at the position of arrow $A_{n+1}$. The latter Z-shaped busbar 1 is connected, with its negative plate 12, located at the position of upper horizontal part $c_{n+1}$ of arrow $A_{n+1}$, to the negative terminals of the battery cells $50_{n+2}$ of (n+2)-th battery cell block $5_{n+2}$. Accordingly, similar to the Z-shaped busbar 1 located at the position of arrow $A_n$, an electric potential established between the positive terminals of the battery cells $50_{n+1}$ of the battery cell block $5_{n+1}$ and the negative terminals of the battery cells $50_{n+2}$ of the adjacent battery cell block $5_{n+2}$. Due to this electric potential, electric current is collected the positive plate 11 of the Z-shaped busbar 1 located at a position of lower horizontal part $a_{n+1}$ of the Z-shaped arrow $A_{n+1}$ and subsequently led, via the vertical part $b_{n+1}$ of arrow $A_{n+1}$, to the upper part $c_{n+1}$ of arrow $A_{n+1}$, the position of the upper horizontal part $c_{n+1}$ corresponding to the position of the negative plate 12 of the Z-shaped busbar 1 connecting the positive terminals of battery cells $50_{n+1}$ and the negative terminals of battery cells $50_{n+2}$.

A similar process occurs between the positive terminals of the battery cell block $5_{n+2}$ and the negative terminals of the battery cell block $5_{n+3}$ such that electric current flows along the Z-shaped busbar 1 located at the position of arrow $A_{n+2}$. Further, similar processes also occur between further battery cell blocks 5 located to the right and to the left of the four battery cell blocks $5_n$, $5_{n+1}$, $5_{n+2}$, $5_{n+3}$ illustrated in FIG. 5.

FIGS. 6A-6F schematically illustrate the assembly of a battery cell stack according to an embodiment of the present disclosure. FIGS. 6A-6F are a continuation of the steps shown in FIGS. 4A-4C. For example, steps S1 to S3 depicted in FIGS. 6A-6C correspond to (or are identical to) the respective steps S1 to S3 illustrated in FIGS. 4A-4C, respectively. Therefore, reference signs are mostly omitted in FIGS. 6A-6C for the sake of simplicity, and for a description of steps S1 to S3 shown in FIGS. 6A-6C, we refer to the above remarks with respect to FIGS. 4A-4C, respectively.

According to one embodiment of the method (manufacture process) for assembling the stack of battery cells according to the present disclosure, the stack 6 of battery cell blocks 5 (in the following also shortly referred to as the "stack" 6) as shown in FIGS. 4C and 6C is further stabilized by two frame beams 71, 72. Each of the two frame beams 71, 72 is sufficiently long to cover one of the lateral sides of the stack 6. The mounting of the frame beams 71, 72 onto the stack 6 is shown in, for example, FIGS. 6D-6F. Therefore, subsequent to steps S1, S2, and S3, which are described above with reference to FIGS. 4A-4C, a further step S4 is performed, which is illustrated in FIG. 6D. Step S4 includes a first sub-step S41 of attaching the first frame beam 71 to the left lateral side of the stack 6 (orientation as shown in the figure) and a second sub-step S42 of attaching the second frame beam 72 to the opposite right lateral side of the stack 6. The process of attaching as performed in sub-steps S41 and S42 is indicated by the respective arrows in FIG. 6D.

Step S4 is also illustrated in the detailed view of FIG. 6E, which shows an enlarged section of FIG. 6D. Again, the arrows indicate how the left lateral side of the stack 6 is connected to the first frame beam 71. The busbars of the cell bricks 10 in the stack 6 (see, e.g., the description of FIGS. 4A-4C) include tabs or straps 120. In the cell bricks 10 corresponding to the cell brick 10 shown in FIGS. 1 and 2 (e.g., each of the cell bricks 10 except for the initial cell brick 100; see the description of FIGS. 4A-4C), the tabs or straps are provided by straps 111 and 112 of the positive plate 11, straps 121 and 122 of the negative plate 12, and straps 131 and 132 of the connection plate 13.

Figure 7A:
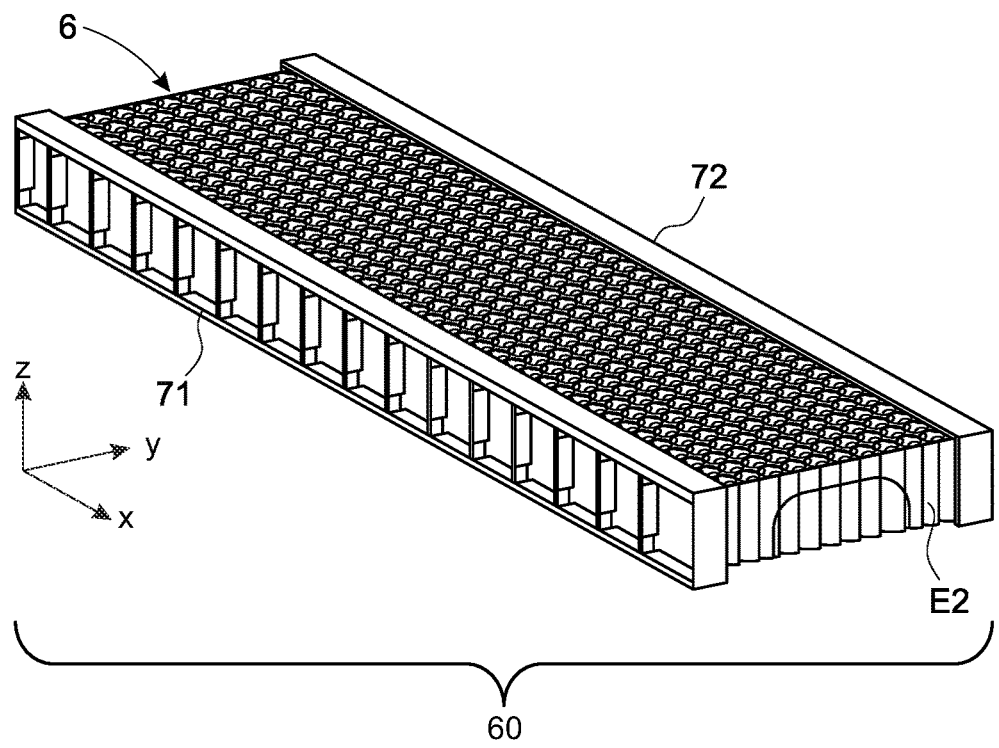
FIG. 7A illustrates a battery cell stack according to an embodiment of the present disclosure.

Corresponding to the tabs or straps 120, which each act as a male fastening element, the first frame beam 71 has a plurality of slots 700, which each act as a female fastening element configured to engage with one of the tabs or straps 120. The slots 700 are arranged at positions on the first frame beam 71 that correspond to the positions of the tabs or straps 120 such that each of the tabs or straps 120 penetrates one of the slots 700 when the stack 6 and the first frame beam 71 are attached to each other. The slots 700 may be provided as flat openings in the first frame beam 71. Then, these slots 700 remain visible after the assembly of the stack 6 with the frame beams 71, 72 to form the battery cell stack 60 as depicted in FIGS. 6F and 7A. The positions of the slots 700 in the first frame beam 71 are also indicated in FIG. 6F.

FIGS. 6E and 6F illustrate the interplay of the tabs or straps 120, the cell bricks 10, and the slots 700 in the frame beams 71, 72 with respect to the first frame beam 71. It is understood that a similar construction of tabs or straps configured to engage with suitable slots is also provided for mounting the second frame beam 72 onto the stack 6.

The result of step S4, explained with reference to FIGS. 6D-6F, refers to an embodiment of a battery cell stack 60 according to the present disclosure as illustrated in FIG. 7A. For example, the battery cell stack 60 shown in FIG. 7A includes the stack 6 of the battery cell blocks 5 as described above with reference to FIGS. 4C and 6C as well as the first and second frame beam 71, 72 attached to the lateral sides of the stack 6 of battery cell blocks 5. The end of battery cell stack 60 is orientated in the x-direction of the depicted coordinate system and is formed by the negative end busbar E2, described above with respect to FIG. 4C. For example, the negative end busbar E2 may act as the negative terminal of the battery cell stack 60.

Figure 7B:
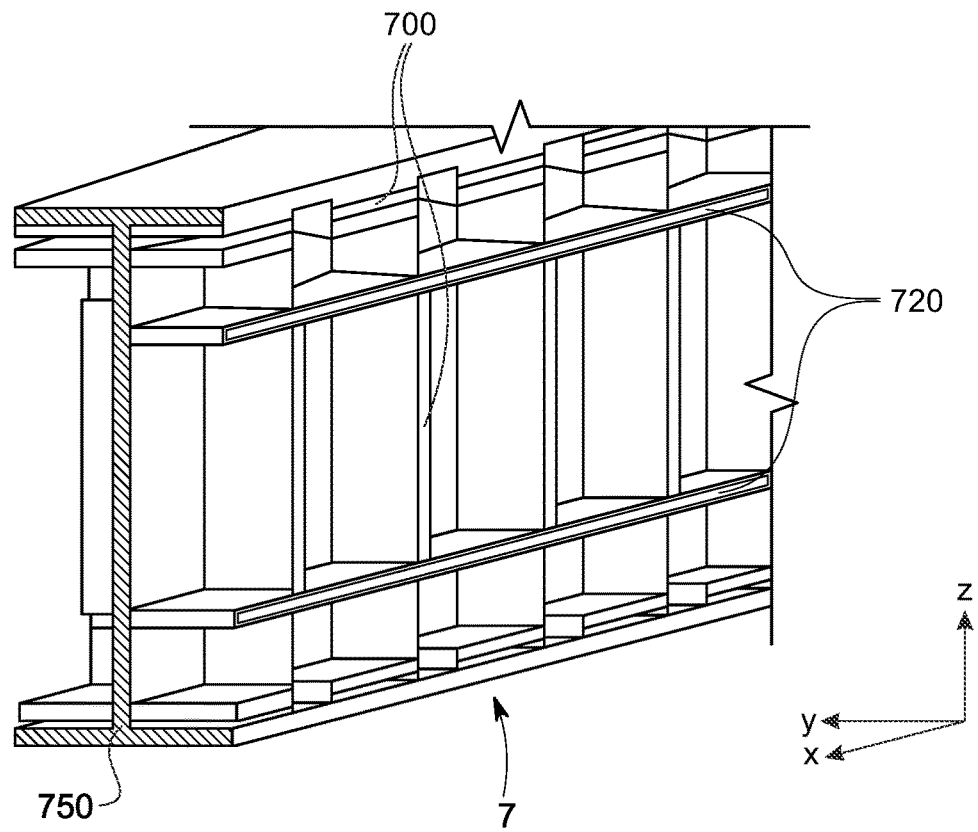
FIG. 7B illustrates, schematically, a 3-dimensional cut-away of a frame beam of the battery cell stack according to an embodiment of the present disclosure.

In the embodiment illustrated in FIGS. 6D-6F, each Z-shaped busbar 1, and accordingly each cell brick 10, includes (or is provided with) three straps 120 on the lateral area, which are inserted into corresponding slots 700 on the frame beam (see, e.g., FIG. 7B). Then, the major structural connection may be established with an adhesive glue material 702 (see, e.g., FIG. 6F).

FIG. 7B illustrates, schematically, a part (e.g., 3-dimensional cut-away) of a frame beam 7. The frame beam 7 may be the first frame beam 71 or the second frame beam 72 as described above with respect to FIGS. 6 and 7A. The lateral sides of the frame beam 7 may be strengthened by a strut construction (e.g., a rib structure) 720 including a plurality of vertical struts (extending along the z-direction of the coordinate system) and a plurality of horizontal struts (extending along the x-direction). The strut construction 720 provides improved mechanical stability of the frame beam 7. The strut construction 720 also forms the slots 700, as described in more detail above with reference to FIGS. 6D-6F.

The material of the frame beam 7 may be an electrically non-conducting material. For example, the frame beam 7 (and, accordingly, the first frame beam 71 and the second frame beam 72 described above with reference to FIGS. 6 and 7A) may be made of high-strength plastics.

The high-strength plastic-profile of the frame beam 7 may be manufactured by using established combi-processes. A crossbeam structure (e.g., an H-profile) 750, shown hatched in FIG. 7B, further improves the mechanical stability of the frame beam 7. The crossbeam structure 750 may be reinforced with continuous fiberglass filament (pultrusion technique). Any of the remaining structures, such as the rib structure 720, fixation points, and the joining area (e.g., the slots 700) for the Z-shaped busbar 1 interfaces (e.g., the tabs or straps 120; see, e.g., FIG. 6) may be formed integrally (e.g., may be formed as one piece) by conventional injection molding techniques.

The manufacture of a battery cell stack according to another embodiment of the present disclosure will be described below with reference to FIGS. 8A-8D. FIG. 8A shows an example of a stack 6a of battery cell blocks 5 that essentially corresponds to the stack 6 of battery cell blocks 5 as described above with reference to FIGS. 4A-4C and 6A-6F. However, the stack 6a of battery cell blocks 5 depicted in FIG. 8A includes cell bricks 10 including Z-shaped busbars with tabs or straps T-different from the tabs or straps 120 shown in FIGS. 6D-6F (or the tabs or straps 111, 112, 121, 122, 131, 133 of the Z-shaped busbar 1 shown in FIG. 1)—bent down with their outer tips in or against the z-direction so as to form bent notches. Each of these tabs or straps T has a pair of openings (e.g., holes or bore-holes) O arranged on the respective bent notches, and each of the openings O is configured to receive a rivet 730.

A first frame beam 71a and a second frame beam 72a are also provided. The frame beams 71a, 72a may be made of the same material as the frame beams 71, 72 described above. The first and second frame beams 71a, 72a may each have a U-profile. The first and second frame beams 71a, 72a may each have a plurality of openings (e.g., holes or bore-holes) 711a, 721a, which are configured to receive the rivets 730. Then, the first and second frame beams 71a, 72a can be attached to the lateral sides of the stack 6a of battery modules such that the positions of the openings O in each of the bent tabs or straps T correspond, when viewed in a plane parallel to the x-z-plane of the coordinate system, to the positions of the openings 711a, 721a in the first and second frame beams 71a, 72a. This correspondence (or alignment) is indicated by the dashed lines R in FIG. 8C.

Then, in step S4a (which corresponds to step S4 in the manufacture process shown in FIG. 6D with reference to the embodiment of the battery cell stack 60 illustrated in FIG. 7A), illustrated in FIG. 8B, the first frame beam 71a is attached to the left lateral side of the stack 6a in a first sub-step S41a of step S4a, and the second frame beam 72a is attached to the right lateral side of the stack 6a in a second sub-step S42a of step S4a. The first sub-step S41a and the second sub-step S42a are indicated in FIG. 4B by arrows.

FIG. 8C shows a cut-away portion of FIG. 8B, in which details of the structure of the stack 6a and of the first frame beam 71a are illustrated in an enlarged view. In particular, it is indicated that the bore-holes 711a of first frame beam 71a will overlap with the bore-holes O of the bent tabs or straps T, when the first frame beam 71a becomes attached to the left lateral side of stack 6a.

FIG. 8D shows the same region of the assembly as depicted in FIG. 8C except that the first frame beam 71a and the stack 6a of battery modules are in a state in which they are attached to each other. For example, the rivets 730 have been inserted through the openings 711*a* in first frame beam 71*a* and the openings O in the tabs or straps T such that the first frame beam 71*a* is permanently fastened to the tabs or straps T of the Z-shaped busbars 1 in the stack 6*a* of battery modules shown in FIG. 8A.

In the embodiment shown in FIGS. 8A-8D, each Z-shaped busbar includes tabs or straps having bent notches with an integrated opening (or bore-hole) pattern. After an alignment of the opening patterns of frame beam and Z-shaped busbars, the fixation could be fulfilled with a simple fastening technique such as riveting.

SOME REFERENCE SIGNS

1 Z-shaped busbar
5 battery cell block
$5_n$, $5_{n+1}$, $5_{n+2}$, battery cell blocks
6, 6a stack of battery cell blocks
7 frame beam
10 battery cell brick
$10_0$, $10_1$, $10_2$, . . . battery cell bricks
11 positive plate
12 negative plate
13 connection plate
21 positive lead frame
22 negative lead frame
23 pin frame
50 battery cell
$50_n$, $50_{n+1}$, $50_{n+2}$, . . . battery cells
55 vent gas
60 stack of battery cells
71, 71a frame beams
72, 72a frame beams
100 busbar assembly
111, 112 tabs or straps
120 tabs or straps
121, 122 tabs or straps
131, 132 tabs or straps
116 openings in positive plate
126 openings in negative plate
216 openings in positive lead frame
216a, b, c openings in positive lead frame
226 openings in negative lead frame
236 openings in pin frame
238 chamfered pins
700 slots
711a openings
720 strut construction
721a opening
730 rivets
750 crossbeam structure
1312 openings in Z-shaped busbar
2160 opening group
$A_n$, $A_{n+1}$, $A_{n+2}$, Z-shaped arrows
$a_n$, $a_{n+1}$ parts of Z-shaped arrows
$b_n$, $b_{n+1}$ parts of Z-shaped arrows
$c_n$, $c_{n+1}$ parts of Z-shaped arrows
E1 positive end busbar
E2 negative end busbar
L1, L3 laser beams
O openings
P2, P3, P4, P5 arrows
R dashed lines
S1, S2, S3, S4, S4a manufacture steps
S11, S12 sub-steps of step S1
S3n sub-step of step S3
S41, S42 sub-steps of step S4
S41a, S42a sub-steps of step S4a
T openings
x, y, z axes of a Cartesian coordinate system

What is claimed is:

1. An assembly set for assembling a carrier framework for a stack of battery cell blocks, the assembly set comprising:
   a first frame beam and a second frame beam; and
   a Z-shaped busbar, the Z-shaped busbar comprising:
      a positive plate configured for connecting to positive terminals of battery cells of a first battery cell block;
      a negative plate having a plurality of openings at locations corresponding to negative terminals of battery cells of a second battery cell block when the second battery cell block is connected to the negative plate;
      a connection plate connecting the positive plate and the negative plate;
      a negative lead frame extending over a first side of the negative plate of the Z-shaped busbar, the first side of the negative plate being opposite to a second side of the negative plate that is configured to be connected to the negative terminals of the battery cells of the second battery cell block, the negative lead frame being configured to be permanently and directly connected, through the openings in the negative plate, to the negative terminals of the battery cells of the second battery cell block when the second battery cell block is connected to the negative plate;
      a first fastener configured to be fastened to the first frame beam; and
      a second fastener configured to be fastened to the second frame beam.

2. The assembly set according to claim 1, wherein the positive plate, the negative plate, and the connection plate are integrally formed.

3. The assembly set according to claim 1, wherein the connection plate is configured to separate the first battery cell block and the second battery cell block from each other.

4. The assembly set according to claim 1, wherein the Z-shaped busbar further comprises a positive lead frame,
   wherein the positive lead frame is configured to be connected to a first side of the positive plate, the first side being opposite to a second side thereof that is configured to be connected to the positive terminals of the battery cells of the first battery cell block,
   wherein the positive plate has a plurality of openings at locations corresponding to the positive terminals of the battery cells of the first battery cell block when the first battery cell block is connected to the positive plate, and
   wherein the positive lead frame is configured to be permanently connected, through the openings in the positive plate, to the positive terminals of the battery cells of the first battery cell block when the first battery cell block is connected to the positive plate.

5. The assembly set according to claim 4, wherein the positive lead frame has a plurality of openings, and the positions of the openings in the positive lead frame correspond to the positions of the openings in the positive plate when the positive lead frame is connected to the positive plate, and
   wherein the negative lead frame has a plurality of openings, and the positions of the openings in the negative lead frame correspond to the positions of the openings in the negative plate when the negative lead frame is connected to the negative plate.

6. The assembly set according to claim 4, further comprising:
- a plurality of first chamfered pins that protrude from the positive plate to the second side of the positive plate, the first chamfered pins being positioned such that each of the first chamfered pins penetrates a gap between adjacent ones of the battery cells when the first battery cell block is connected to the positive plate; and
- a plurality of second chamfered pins that protrude from the negative plate to the second side of the negative plate, the second chamfered pins being positioned such that each of the second chamfered pins penetrates a gap between adjacent ones of the battery cells when the second battery cell block is connected to the negative plate.

7. The assembly set according to claim 6, further comprising:
- a first pin frame that is configured to be connected to the positive plate or to the positive lead frame, the first chamfered pins protruding from the first pin frame, and the positive plate and the positive lead frame each have openings through which the first chamfered pins of the first pin frame extend when the first pin frame is connected to the positive plate or to the positive lead frame; and
- a second pin frame that is configured to be connected to the negative plate or to the negative lead frame, the second chamfered pins protruding from the second pin frame, and the negative plate and the negative lead frame each have openings through which the second chamfered pins of the second pin frame extend when the second pin frame is connected to the negative plate or to the negative lead frame.

8. The assembly set according to claim 1, wherein the first fastener of the Z-shaped busbar comprises a first strap, and the first frame beam has a slot configured to engage with the first strap; and
wherein the second fastener of the Z-shaped busbar comprises a second strap, and the second frame beam has a slot configured to engage with the second strap.

9. The assembly set according to claim 1, further comprising a plurality of rivets,
- wherein the first fastener of the Z-shaped busbar is a first opening, and the first frame beam has an opening such that the Z-shaped busbar is connectable to the first frame beam by inserting one of the rivets through the first opening in the Z-shaped busbar and through the opening in the first frame beam; and
- wherein the second fastener of the Z-shaped busbar is a second opening, and the second frame beam has an opening such that the Z-shaped busbar is connectable to the second frame beam by inserting another one of the rivets through second opening in the Z-shaped busbar and through the opening in the second frame beam.

10. The assembly set according to claim 1, further comprising:
- a positive end busbar configured to be connected to the positive terminals of the battery cells of one of the first and second battery cell blocks; and/
- a negative end busbar configured to be connected to the negative terminals of the battery cells of the other of the first and second battery cell blocks.

11. The assembly set according to claim 1, further comprising:
- the first battery cell block connected, with the positive terminals of the battery cells of the first battery cell block, to the positive plate of the Z-shaped busbar; and
- the second battery cell block connected, with the negative terminals of the battery cells of the second battery cell block, to the negative plate of the Z-shaped busbar,
- wherein the Z-shaped busbar and the first and second battery cell blocks are assembled such that the positive plate of the Z-shaped busbar is connected to the positive terminals of the battery cells of the first battery cell block and the negative plate of the Z-shaped busbar is connected to the negative terminals of the battery cells of the second battery cell block.

12. A battery cell stack comprising the assembly set for assembling a stack of battery cells according to claim 11,
- wherein the Z-shaped busbar is connected, with the positive plate, to the positive terminals of the battery cells of the first battery cell block and is connected, with the negative plate, to the negative terminals of the battery cells of the second battery cell block, and
- wherein the first frame beam is connected to the Z-shaped busbar, and the second frame beam is connected to the Z-shaped busbar.

13. A vehicle comprising the battery cell stack according to claim 12.

14. A method for assembling a battery cell stack, the method comprising:
- providing a plurality of battery cell bricks, each of the battery cell bricks comprising:
  - the Z-shaped busbar according to claim 1; and
  - a first battery cell block, positive terminals of battery cells of the first battery cell block are connected to the positive plate of the Z-shaped busbar;
- providing one a second battery cell block;
- providing a first frame beam and a second frame beam, each of the first and second frame beams being configured to be fixed to the Z-shaped busbar;
- connecting a first one of the battery cell bricks by connecting the negative plate of the Z-shaped busbar of the first one of the battery cell bricks to negative terminals of battery cells of the second battery cell block;
- connecting a second one of the battery cell bricks by connecting the negative plate of the Z-shaped busbar of the second one of the battery cell bricks to the negative terminals of the battery cells of the second battery cell block of the battery cell brick; and
- fixing the first frame beam to each of the Z-shaped busbars, and fixing the second frame beam to each of the Z-shaped busbars.

15. The method according to claim 14, further comprising repeatedly connecting ones of the battery cells bricks until all of the battery cell bricks are connected.

16. An assembly set for assembling a carrier framework for a stack of a plurality of battery cell blocks, the assembly set comprising:
- a plurality of Z-shaped busbars used as self-supporting cell-carriers and having a Z-shape before being connected to battery cells; and
- a first frame beam and a second frame beam, each of the first frame beam and the second frame beam extending along one lateral side of the stack opposite to each other to overlap the plurality of battery cell blocks, a length of each of the first frame beam and the second frame beam being configured to cover the lateral sides of the stack opposite to each other,
- wherein each of the Z-shaped busbars comprises:
  - a positive plate configured for connecting to positive terminals of battery cells of one of the battery cell blocks;

a negative plate configured for connecting negative terminals of battery cells of another one of the battery cell blocks; and a connection plate connecting the positive plate and the negative plate, the connection plate directly facing battery cells of the battery cell blocks that are adjacent thereto from among the battery cell blocks and separating adjacent ones of the battery cell blocks from among the plurality of battery cell blocks from each other, wherein each of the Z-shaped busbars further comprises:
  a first fastener configured for being fastened to the first frame beam; and
  a second fastener configured for being fastened to the second frame beam, wherein the first frame beam comprises a number of first fastener such that all of the Z-shaped busbars are connected with the respective first fastener of the Z-shaped busbars to the first frame beam, and wherein the second frame beam comprises a number of second fasteners such that all of the Z-shaped busbars are connected with the respective second fastener of the Z-shaped busbars to the second frame beam.

* * * * *